(12) United States Patent
Ford et al.

(10) Patent No.: US 12,168,320 B2
(45) Date of Patent: Dec. 17, 2024

(54) SYSTEMS AND METHODS FOR THE CONSTRUCTION OF STRUCTURES UTILIZING ADDITIVE MANUFACTURING TECHNIQUES

(71) Applicant: ICON Technology, Inc., Austin, TX (US)

(72) Inventors: Jason Ford, Austin, TX (US); Alex Le Roux, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 0 days.

(21) Appl. No.: 18/130,424

(22) Filed: Apr. 4, 2023

(65) Prior Publication Data

US 2023/0347581 A1     Nov. 2, 2023

Related U.S. Application Data

(60) Continuation of application No. 17/407,686, filed on Aug. 20, 2021, now Pat. No. 11,618,214, which is a
(Continued)

(51) Int. Cl.
    B29C 64/153     (2017.01)
    B33Y 10/00     (2015.01)
(Continued)

(52) U.S. Cl.
    CPC ............ *B29C 64/153* (2017.08); *B33Y 10/00* (2014.12); *B33Y 30/00* (2014.12); *B33Y 80/00* (2014.12)

(58) Field of Classification Search
None
See application file for complete search history.

(56) References Cited

U.S. PATENT DOCUMENTS 7,641,461 B2 *   1/2010   Khoshnevis ........ E04G 21/0463
                                                                         425/375
10,399,280 B1     9/2019   Lensgraf et al.
(Continued)

FOREIGN PATENT DOCUMENTS

CN        207841654 U   *   9/2018
CN        209011362 U   *   6/2019
(Continued)

OTHER PUBLICATIONS

Baumgärtel, Tim, Extended European Search Report mailed Jun. 28, 2022 for European Patent Application No. EP 18943629.8, 46 pages.

(Continued)

*Primary Examiner* — Yung-Sheng M Tsui
(74) *Attorney, Agent, or Firm* — KOKKA & BACKUS, PC

(57) ABSTRACT

Embodiments disclosed herein relate to methods of constructing a structure and related non-transitory computer readable medium. In an embodiment, the method includes (a) defining a vertical first slice and a second vertical slice of the structure. A lateral cross-section of the structure within the first vertical slice is different than the lateral cross-section of the structure for the second vertical slice. In addition, the method includes (b) depositing a plurality of first vertically stacked layers of an extrudable building material with a printing assembly to form the first vertical slice. Further, the method includes depositing a plurality of second vertically stacked layers of the extrudable building material atop the first vertical slice with the printing assembly to form the second vertical slice.

19 Claims, 27 Drawing Sheets

Related U.S. Application Data division of application No. 16/230,585, filed on Dec. 21, 2018, now Pat. No. 11,179,927.

(51) Int. Cl.
*B33Y 30/00* (2015.01)
*B33Y 80/00* (2015.01)

(56) References Cited

U.S. PATENT DOCUMENTS

| | | |
|---|---|---|
| 11,179,927 B2 | 11/2021 | Ford et al. |
| 11,618,214 B2 | 4/2023 | Ford et al. |
| 2015/0314533 A1 | 11/2015 | Yu et al. |
| 2015/0343705 A1 | 12/2015 | Chen et al. |
| 2016/0059315 A1 | 3/2016 | Baudimont et al. |
| 2016/0167303 A1 | 6/2016 | Petelet |
| 2016/0214317 A1 | 7/2016 | Kobayashi |
| 2016/0288426 A1 | 10/2016 | Yoshida et al. |
| 2017/0173892 A1 | 6/2017 | Steele et al. |
| 2017/0232549 A1 | 8/2017 | Lacaze et al. |
| 2017/0248937 A1 | 8/2017 | Guimbretiere et al. |
| 2017/0304947 A1 | 10/2017 | Shibazaki |
| 2017/0355139 A1 | 12/2017 | Wolf et al. |
| 2017/0365365 A1* | 12/2017 | White ............... H05K 9/0001 |
| 2017/0371318 A1 | 12/2017 | Morovic et al. |
| 2018/0036800 A1 | 6/2018 | Torabi et al. |
| 2018/0222124 A1 | 9/2018 | Susnjara et al. |
| 2019/0337231 A1 | 11/2019 | Fan et al. |
| 2020/0198318 A1 | 6/2020 | Ford et al. |
| 2021/0379822 A1 | 12/2021 | Ford et al. |

FOREIGN PATENT DOCUMENTS

| | | |
|---|---|---|
| KR | 1020150079119 | 7/2015 |
| KR | 101706473 | 2/2017 |
| KR | 1020180087486 A | 8/2018 |
| KR | 101895151 | 9/2018 |
| WO | 2011021080 A2 | 2/2011 |
| WO | 2017153790 A1 | 9/2017 |

OTHER PUBLICATIONS

Bos et al., Additive manufacturing of concrete in construction: potentials and challenges of 3D concrete printing, Virtual and Physical Prototyping, vol. 11, No. 3, pp. 209-255, published online Aug. 2, 2016. (Year: 2016).

Commissioner, International Application Division of the Korean Intellectual Property Office, International Searching Authority, Notification of Transmittal of the International Search Report and Written Opinion for International Application No. PCT/US2018/067311 mailed Dec. 21, 2018.

Moladi et al., 3D Print a House, Mold Plastic Formwork Construction Technology, Published Jan. 5, 2017, retrieved online on Jun. 17, 2022, URL: https://moladi.blogspot.com/2017/01/printing-3d-house.htm. (Year: 2017).

Tsui, Yung-Sheng M., Final Office Action mailed Apr. 19, 2021 for U.S. Appl. No. 16/230,585.

Tsui, Yung-Sheng M., Non-Final Office Action mailed Dec. 28, 2020 for U.S. Appl. No. 16/230,585.

Tsui, Yung-Sheng M., Non-Final Office Action mailed Jun. 4, 2021 for U.S. Appl. No. 16/230,585.

Tsui, Yung-Sheng M., Non-Final Office Action mailed Oct. 27, 2020 for U.S. Appl. No. 16/230,585.

Tsui, Yung-Sheng M., Non-Final Office Action mailed Sep. 14, 2022 for U.S. Appl. No. 17/407,686.

Tsui, Yung-Sheng M., Notice of Allowance and Fee(s) Due mailed Dec. 5, 2022 for U.S. Appl. No. 17/407,686.

Tsui, Yung-Sheng M., Notice of Allowance and Fee(s) Due mailed Jul. 27, 2021 for U.S. Appl. No. 16/230,585.

Wolfs, R.J.M., 3D Printing of Concrete Structures, Graduation Thesis, Eindhoven University of Technology, Feb. 2015, 110 pages. (Year: 2015).

* cited by examiner

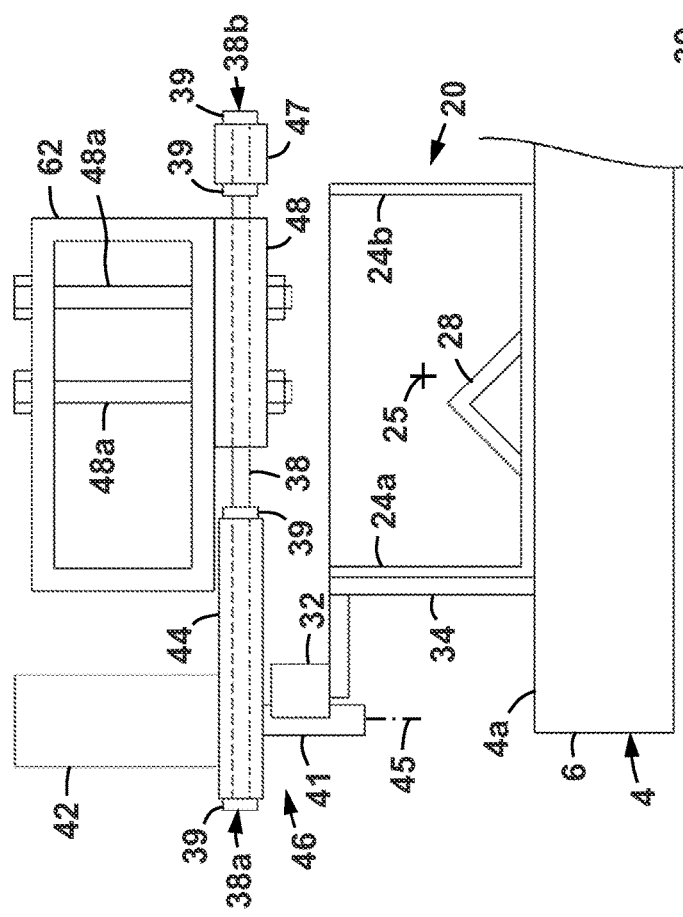
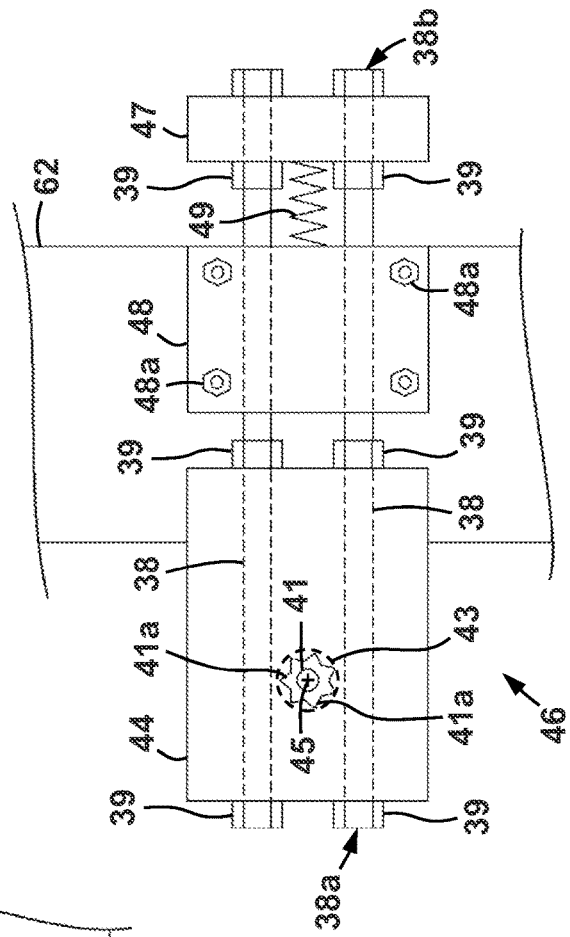
FIG. 6
FIG. 7

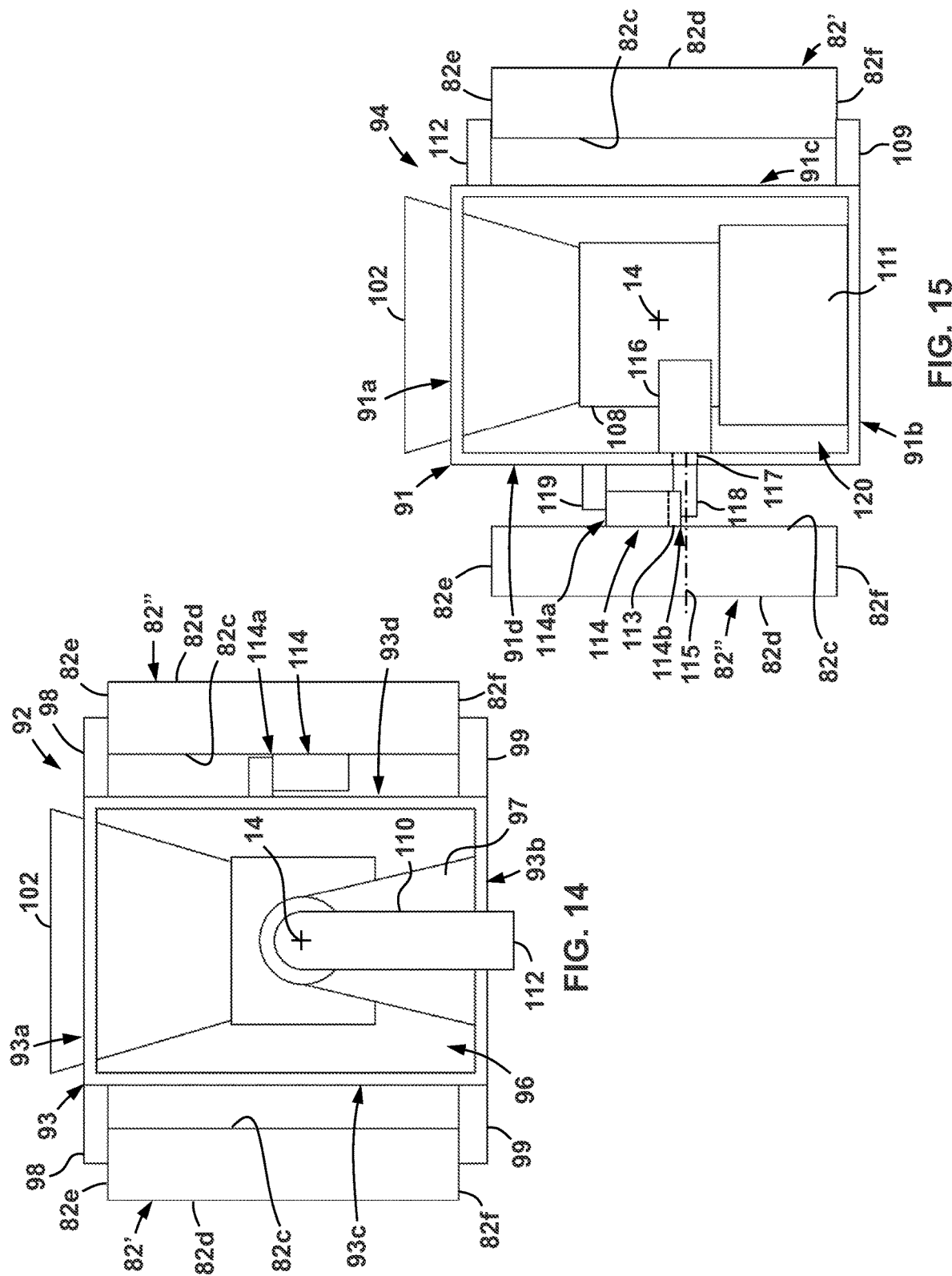

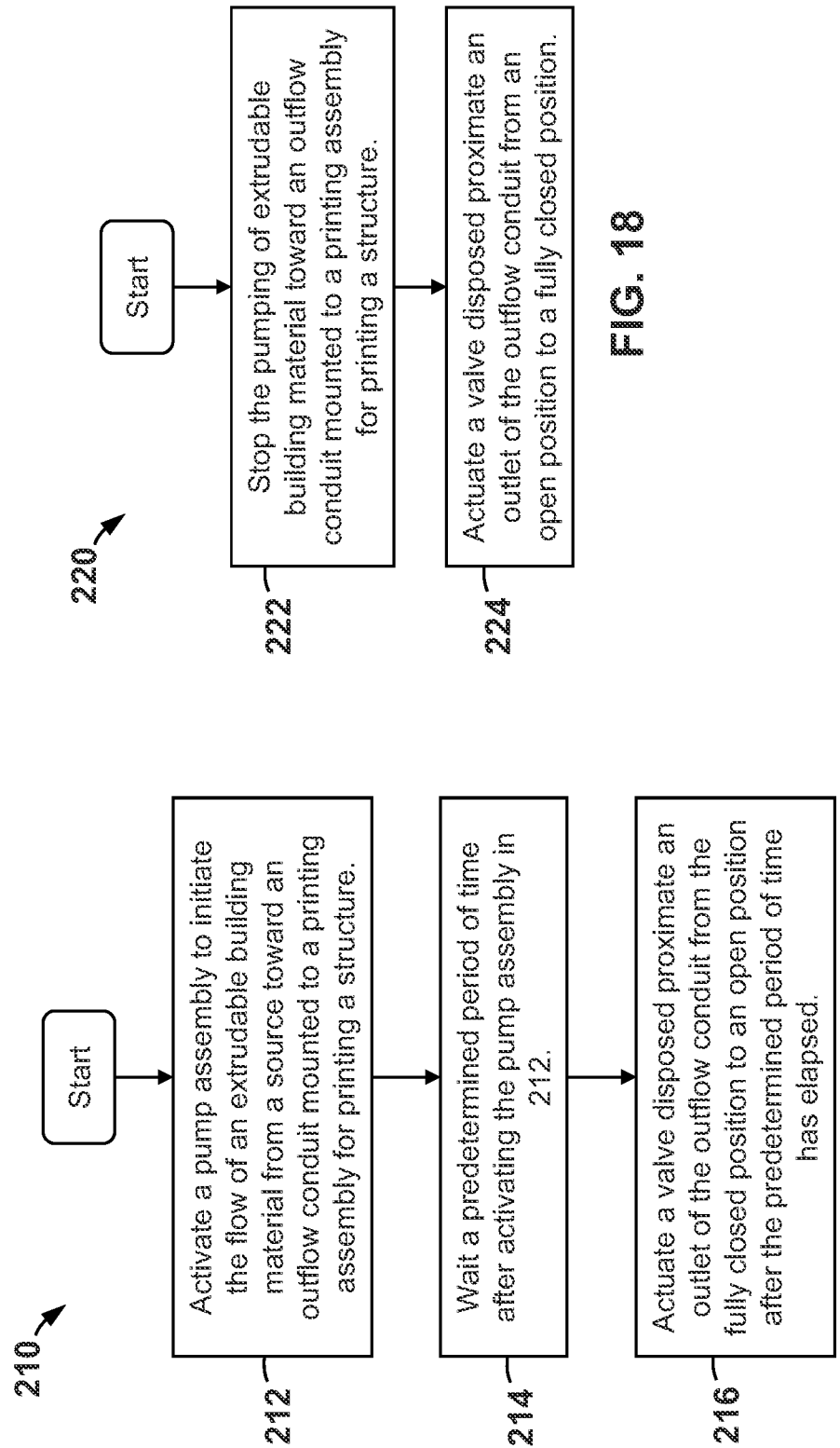

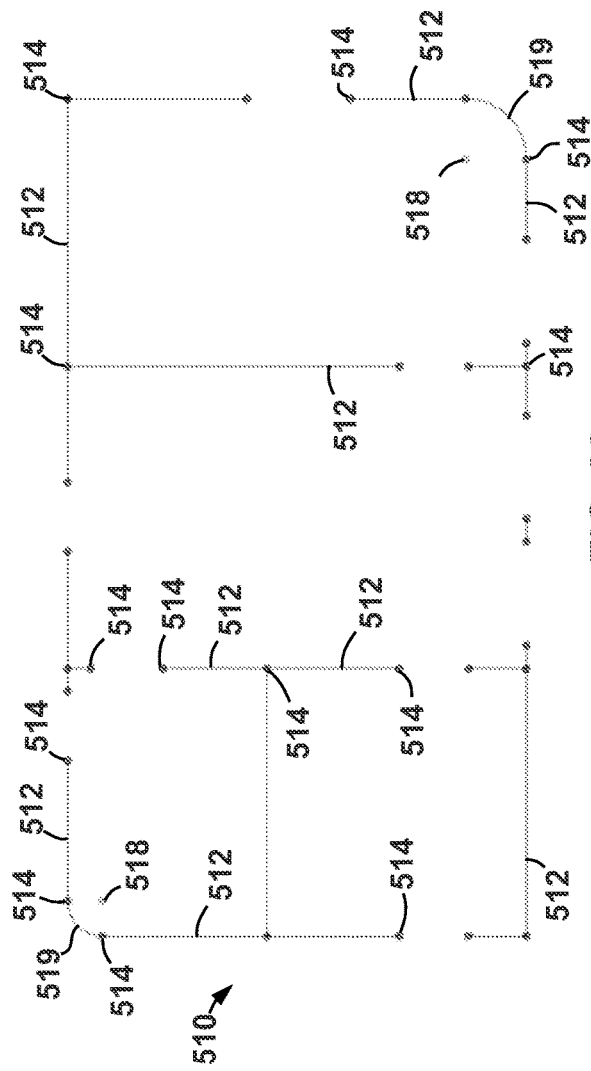
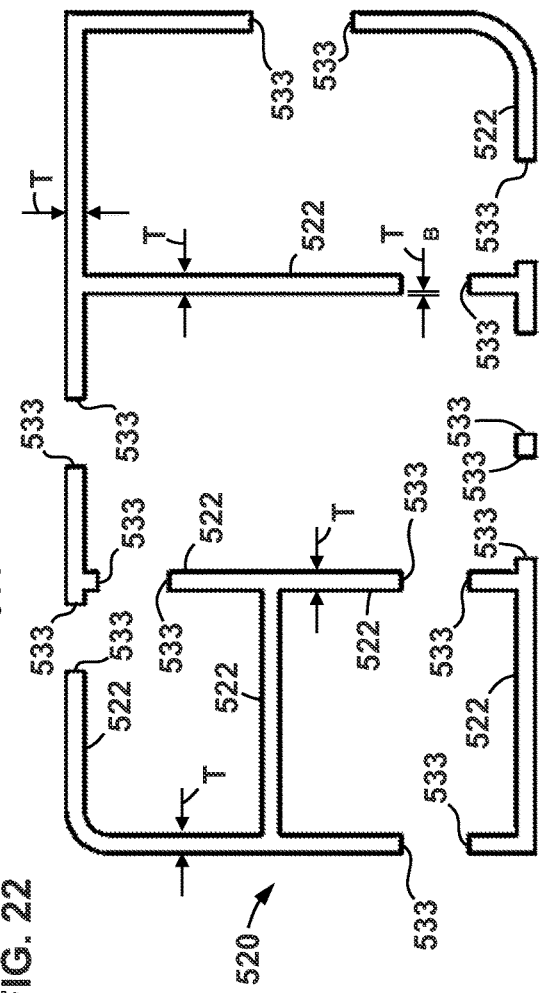
FIG. 22
FIG. 23

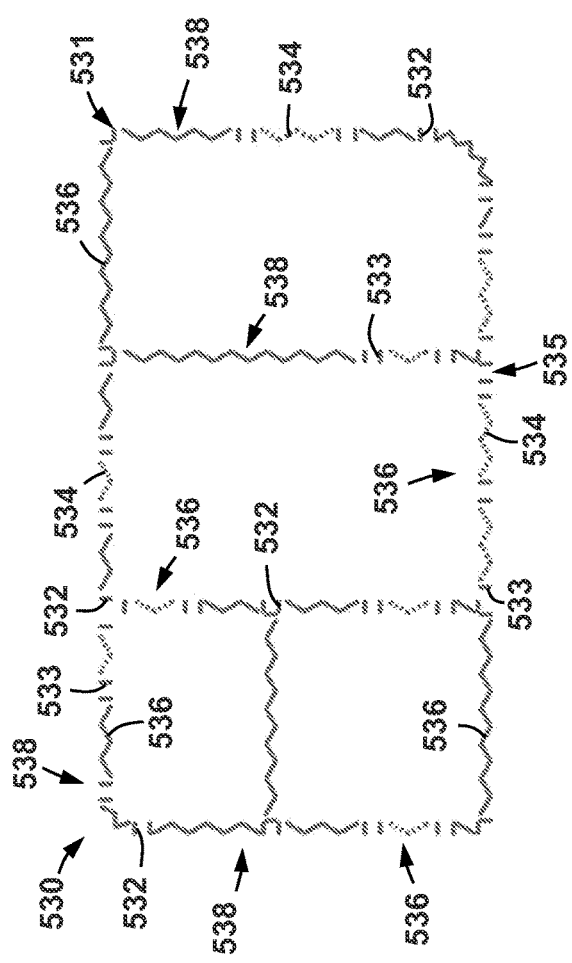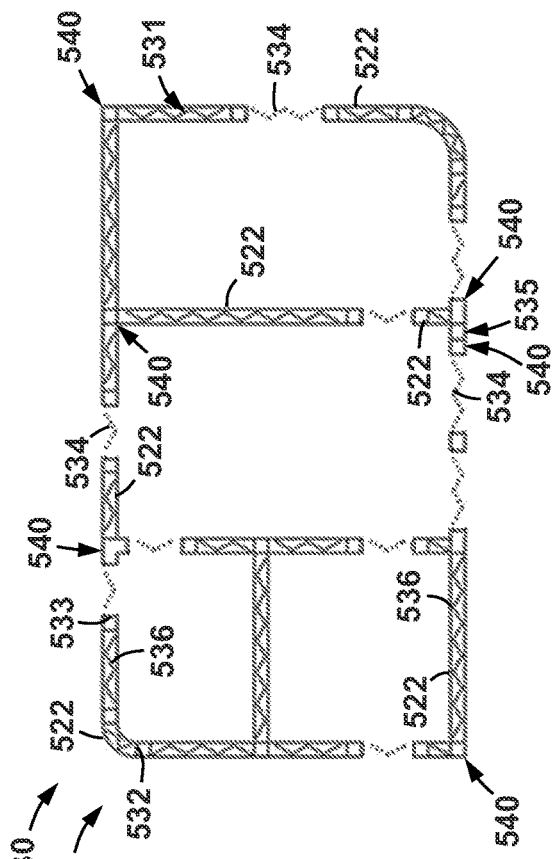

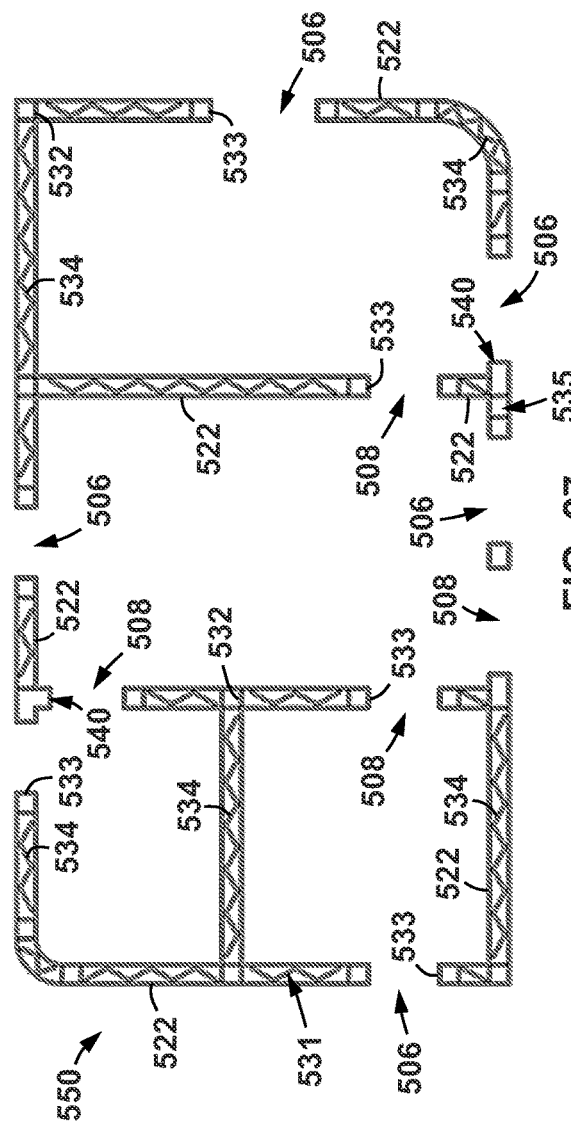
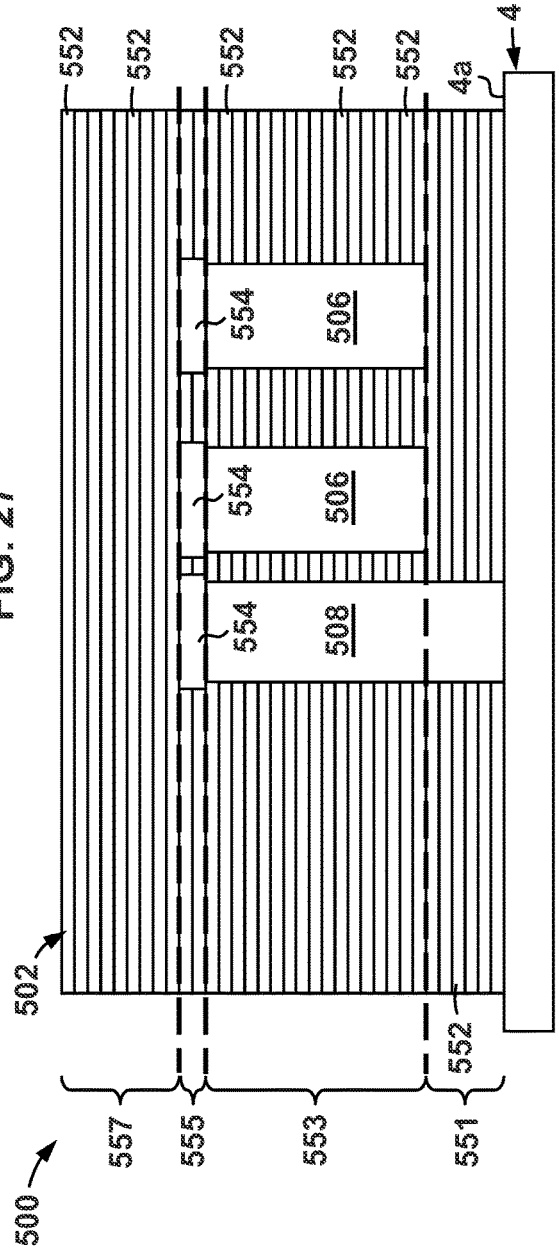
FIG. 27
FIG. 28

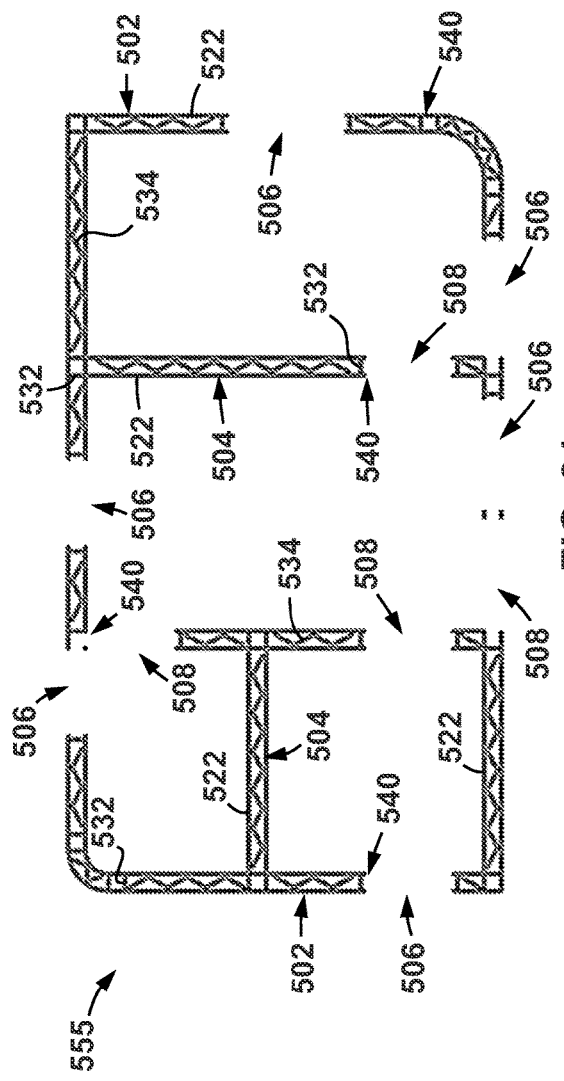
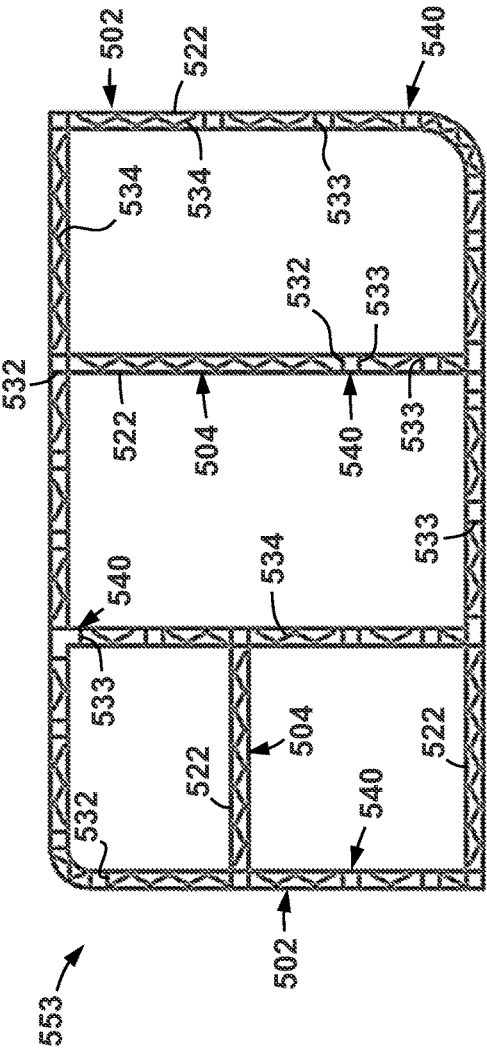
FIG. 31
FIG. 32

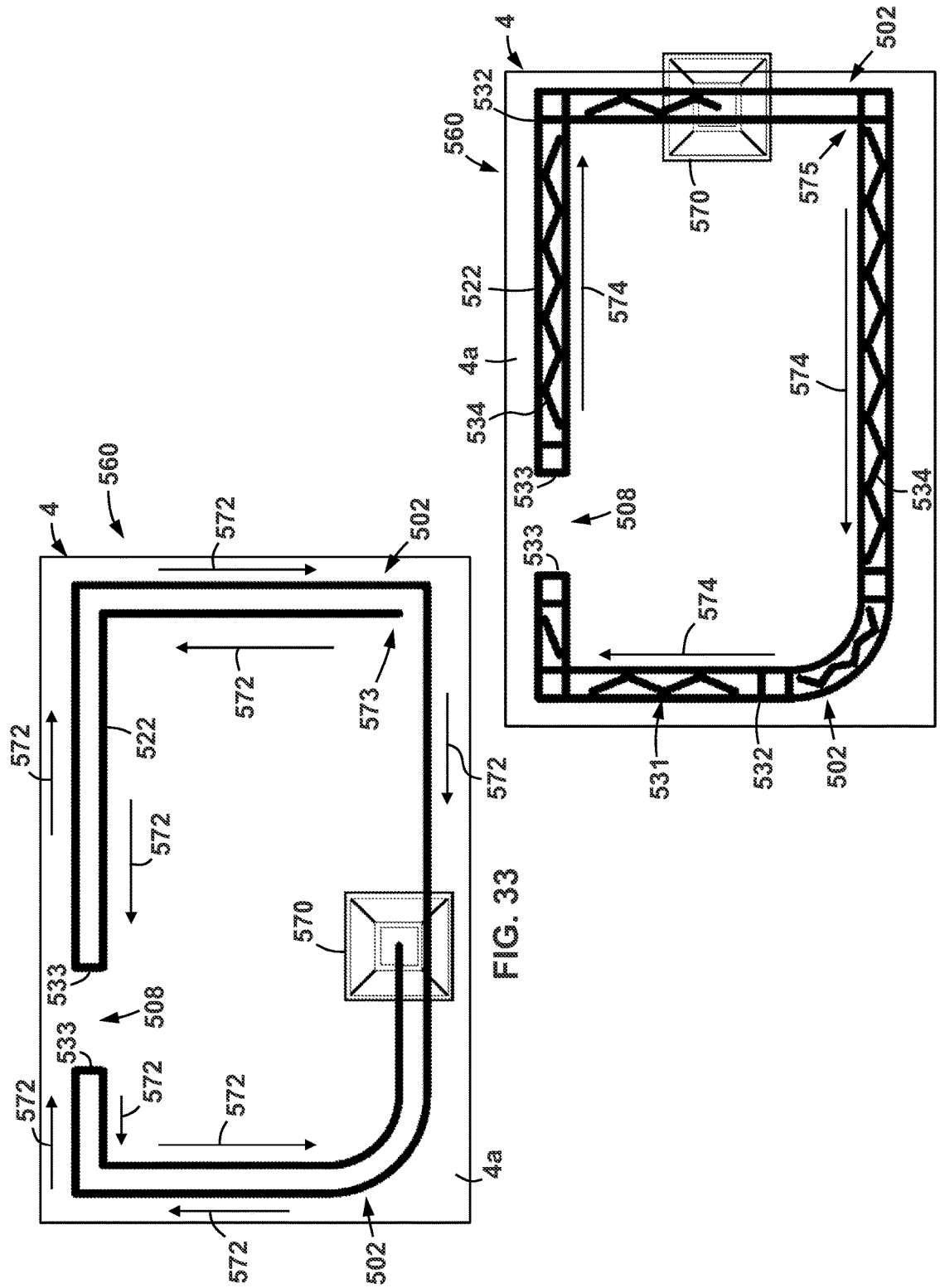

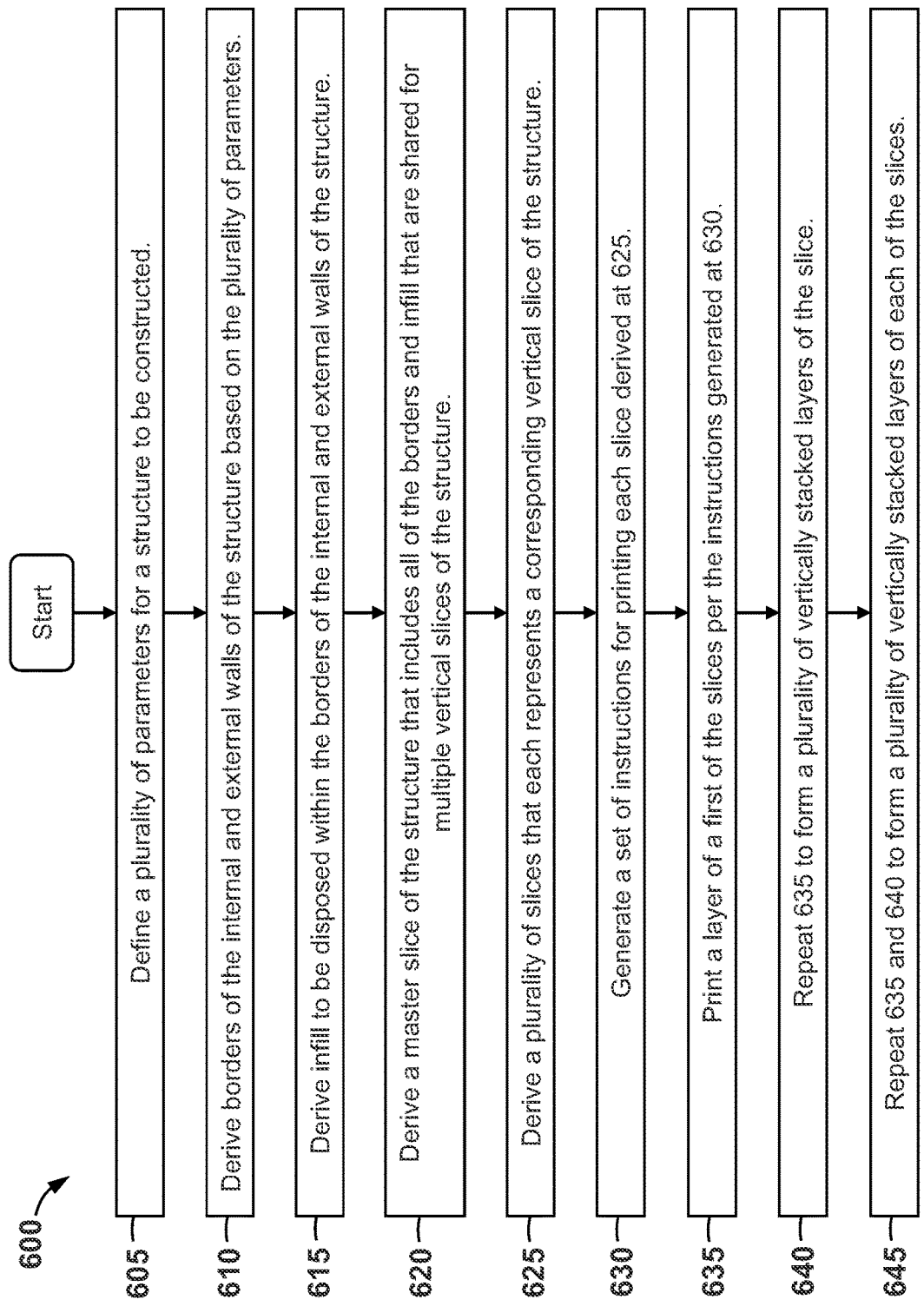

SYSTEMS AND METHODS FOR THE CONSTRUCTION OF STRUCTURES UTILIZING ADDITIVE MANUFACTURING TECHNIQUES

CROSS-REFERENCE TO APPLICATIONS

This application is a continuation application of U.S. patent application Ser. No. 17/407,686, filed Aug. 20, 2021, now U.S. Pat. No. 11,618,214 and titled, "SYSTEMS AND METHODS FOR THE CONSTRUCTION OF STRUCTURES UTILIZING ADDITIVE MANUFACTURING TECHNIQUES," U.S. patent application Ser. No. 17/407,686 is a divisional application of U.S. patent application Ser. No. 16/230,585, filed on Dec. 21, 2018, now U.S. Pat. No. 11,179,927 and titled "SYSTEMS AND METHODS FOR THE CONSTRUCTION OF STRUCTURES UTILIZING ADDITIVE MANUFACTURING TECHNIQUES," all of which are herein incorporated by reference in their entirety for all purposes.

BACKGROUND

This disclosure is generally directed to the design and construction of structures (e.g., dwellings, buildings, etc.). More particular, this disclosure is directed to the design and construction of structures utilizing additive manufacturing techniques.

Structures (e.g., dwellings, buildings, sheds, etc.) may be manufactured with a multitude of different materials and construction methods. Among the materials commonly used in the construction of structures is concrete. For example, concrete may be utilized in the foundation of a structure and possibly in the construction of exterior walls.

BRIEF SUMMARY OF THE DISCLOSURE

Some embodiments disclosed herein are directed to a method of constructing a structure. In an embodiment, the method includes (a) defining a vertical first slice and a second vertical slice of the structure. A lateral cross-section of the structure within the first vertical slice is different than the lateral cross-section of the structure for the second vertical slice. In addition, the method includes (b) depositing a plurality of first vertically stacked layers of an extrudable building material with a printing assembly to form the first vertical slice. Further, the method includes (c) depositing a plurality of second vertically stacked layers of the extrudable building material atop the first vertical slice with the printing assembly to form the second vertical slice.

In other embodiments, the method includes (a) depositing a plurality of first layers of an extrudable building material on a foundation. for each of the first layers, (a) includes: (a1) depositing a bead of the extrudable material to form a first enclosed border of the wall; and (a2) depositing a plurality of beads of the extrudable material within the enclosed border to form an infill within the first enclosed border. In addition, the method includes (b) depositing a plurality of second layers of the extrudable building material atop the plurality of first layers.

Still other embodiments disclosed herein are directed to a non-transitory computer-readable medium containing instructions that, when executed by a processor define a master slice of a structure. The master slice has a lateral cross-section that shows all windows and door frames of the structure open. In addition, the processor is to define a plurality of vertical slices of a structure as a variant of the master slice. A lateral cross-section of each of the plurality of vertical slices is different from the lateral cross-section of the other of the plurality of vertical slices. Further, the processor is to define one of more enclosed borders to represent the walls within each of the plurality of vertical slices, and to define infill to be disposed within each of the one or more enclosed borders. Still further, the processor is to define a tool path for a printing assembly to deposit beads of an extrudable building material to form the one or more enclosed borders and the infill for each of the plurality of vertical slices.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIGS. 6 and 7 are schematic side and bottom views, respectively, of one of the connection block assemblies of the construction system of FIG. 1 according to some embodiments;

FIGS. 14 and 15 and 15 are side views of the printing system of FIG. 11 supported on a trolley bridge assembly of the construction system of FIG. 1 according to some embodiments;

FIGS. 17 and 18 are block diagrams of methods according to some embodiments;

FIG. 22 is a line diagram of the structure of FIG. 21 according to some embodiments;

FIG. 23 is a shell diagram of the structure of FIG. 21 according to some embodiments;

FIG. 24 is an infill diagram of the structure of FIG. 21 according to some embodiments;

FIG. 25 is a diagram showing a super-imposition of the infill diagram of FIG. 24 atop the shell diagram of FIG. 23 according to some embodiments;

FIG. 27 is a diagram of a master slice defined according to some embodiments;

FIG. 28 is a side view of the structure of FIG. 21 according to some embodiments;

FIGS. 29-32 are diagrams of various slices from the structure of FIG. 21 according to some embodiments;

FIGS. 33 and 34 are sequential schematic views of tool paths for forming or printing a layer of a structure according to some embodiments;

FIG. 36 is a diagram of a method for designing and constructing a structure according to some embodiments.

DETAILED DESCRIPTION

Figure 1:
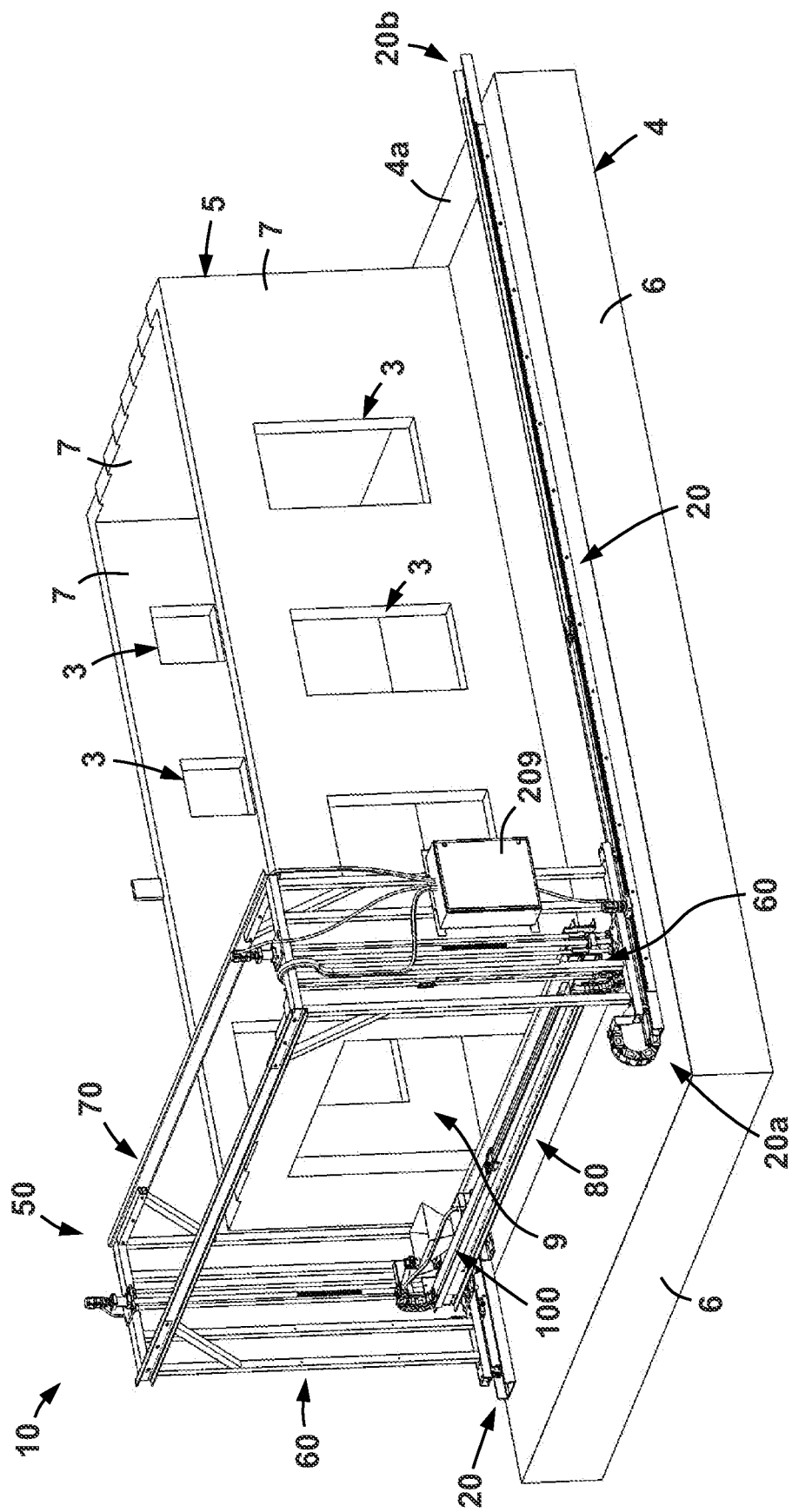
FIG. 1 is a perspective view of a construction system and a structure according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extrudable building material" refers to a building material that may be delivered or conveyed through a conduit (e.g., such as a flexible conduit) and extruded (e.g., via a nozzle or pipe) in a desired location. In some embodiments, an extrudable building material includes a cement mixture (e.g., concrete, cement, etc.). Further, as used herein, the term "computing device" refers to any suitable device (or collection of devices) that is configured to execute, store, and/or generate machine readable instructions (e.g., non-transitory machine readable medium). The term may specifically include devices, such as, computers (e.g., personal computers, laptop computers, tablet computers, smartphones, personal data assistants, etc.), servers, controllers, etc. A computing device may include a processor and a memory, wherein the processor is to execute machine readable instructions that are stored on the memory.

As previously described above, structures (e.g., dwellings, buildings, sheds, etc.) may be manufactured with a multitude of different materials and construction methods. Traditionally, a building (e.g., a dwelling) may be constructed upon a composite slab or foundation that comprises concrete reinforced with re-bar or other metallic materials. The structure itself may then be framed (e.g., with wood and/or metal framing members), and then an outer shell and interior coverings (e.g., ply-wood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a structure is well known and has been successfully utilized in constructing an uncountable number of structures; however, it requires multiple constructions steps that cannot be performed simultaneously and that often require different skills and trades to complete. As a result, this process for designing and constructing a structure can extend over a considerable period (e.g., 6 months to a year or more). Such a lengthy construction period is not desirable in circumstances that call for the construction of a structure in a relatively short period of time.

Accordingly, embodiments disclosed herein include construction systems, methods of construction, and even methods for structure design that allow a structure (such as a personal dwelling) to be constructed in a fraction of the time associated with traditional construction methods. In particular, embodiments disclosed herein utilize additive manufacturing techniques (e.g., three dimensional (3D) printing) in order to produce a structure more quickly, economically, and in a systematic manner.

Figure 2:
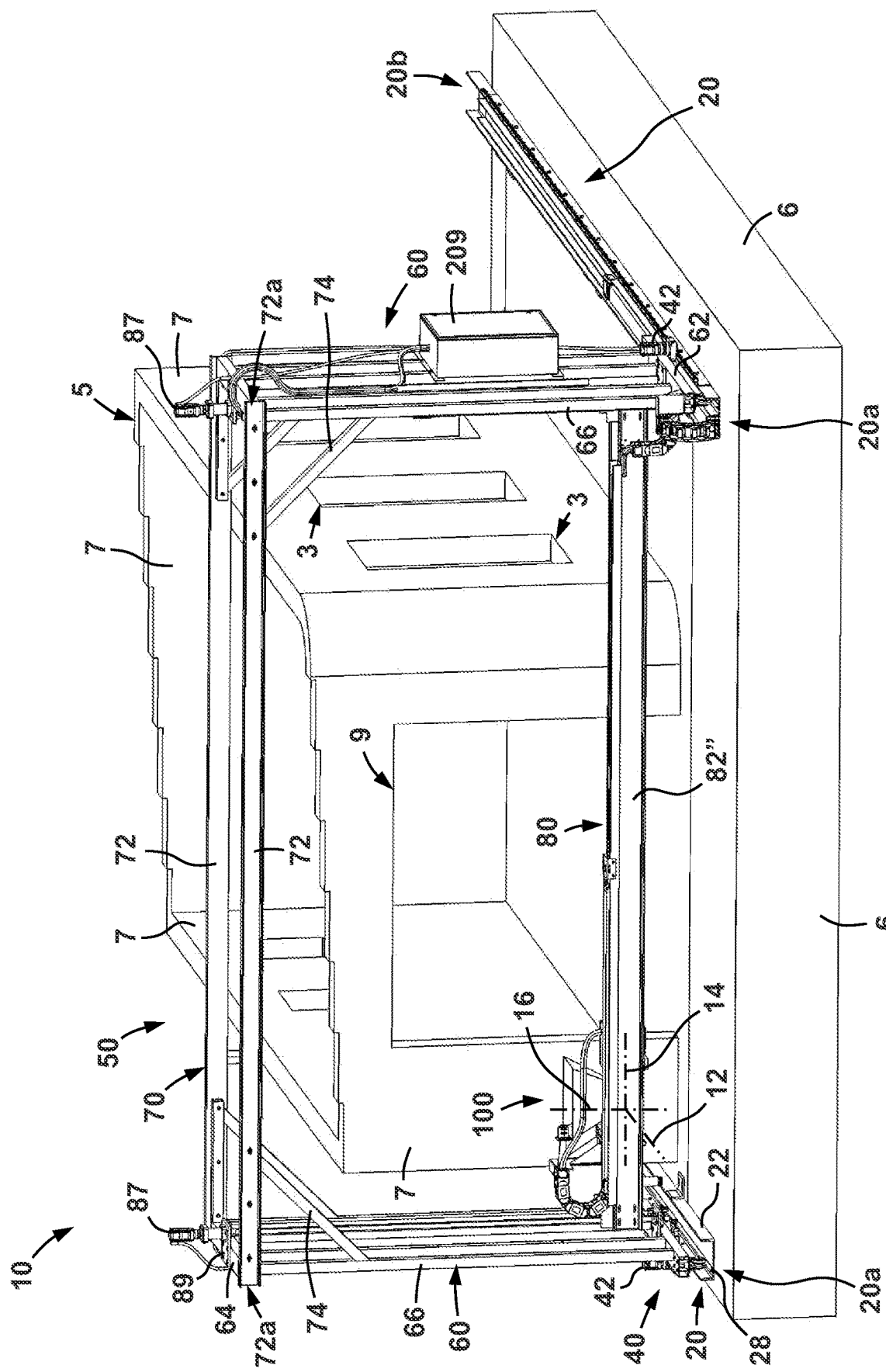
FIG. 2 is another perspective view of the construction system of FIG. 1 according to some embodiments.

Referring now to FIGS. 1 and 2, a construction system 10 according to some embodiments is shown. In this embodiment, construction system 10 generally includes a pair of rail assemblies 20, a gantry 50 movably disposed on rail assemblies 20, and a printing assembly 100 movably disposed on gantry 50. As will be described below, construction system 10 is configured to form a structure, such as for example the structure 5 shown in FIG. 1, via additive manufacturing, specifically 3D printing. In particular, system 10 (via rail assemblies 20 and gantry 50) is configured to controllably move or actuate printing assembly 100 relative to the foundation 4 of structure 5 along each of a plurality of orthogonal movement axes or directions 12, 14, 16 such that printing assembly 100 may controllably deposit an extrudable building material in a plurality of vertically stacked layers to form structure 5. As shown in FIG. 2, axes 12, 14, 16 are each orthogonal to one another—with axis 12 being orthogonal to both axes 14, 16, axis 14 being orthogonal to axes 12 and 16, and axis 16 being orthogonal to axes 12 and 14. In addition, the origin (not shown) of axes 12, 14, 16 is generally disposed at the printing assembly 100.

To ensure the clarity of the following discussion of construction system 10, the details of example structure 5 will be quickly described. In particular, as shown in FIG. 1, structure 5 includes a plurality of walls 7, a plurality of windows 3 extending through the walls 7, and a door frame 9 also extending through one of the walls 7. Structure 5 is formed upon a foundation 4. In this embodiment, foundation 4 is a reinforced concrete slab that is formed by first building an exterior form or mold (not shown), then placing a plurality of metallic rods (e.g., rebar) within the form in a desired pattern (e.g., in a grid pattern), and finally filling the mold with liquid or semi liquid concrete mixture. Once the concrete has sufficiently dried and/or cured (e.g., such that the foundation 4 may support the weight of structure 5), structure 5 may be constructed (e.g., printed) atop foundation 4 utilizing construction system 10. As shown in FIG. 1, foundation includes a planar (or substantially planar) top surface 4a, and a perimeter 6. In some embodiments, axes 12 and 14 form or define a plane that is parallel to top surface 4a of foundation, and axis 16 extends in a normal direction from top surface 4a. Thus, in instances where top surface 4a is substantially level (or perpendicular to the direction of gravity), axes 12, 14 define a level, horizontal or lateral plane, and axis 16 defines the vertical direction.

Figure 3:
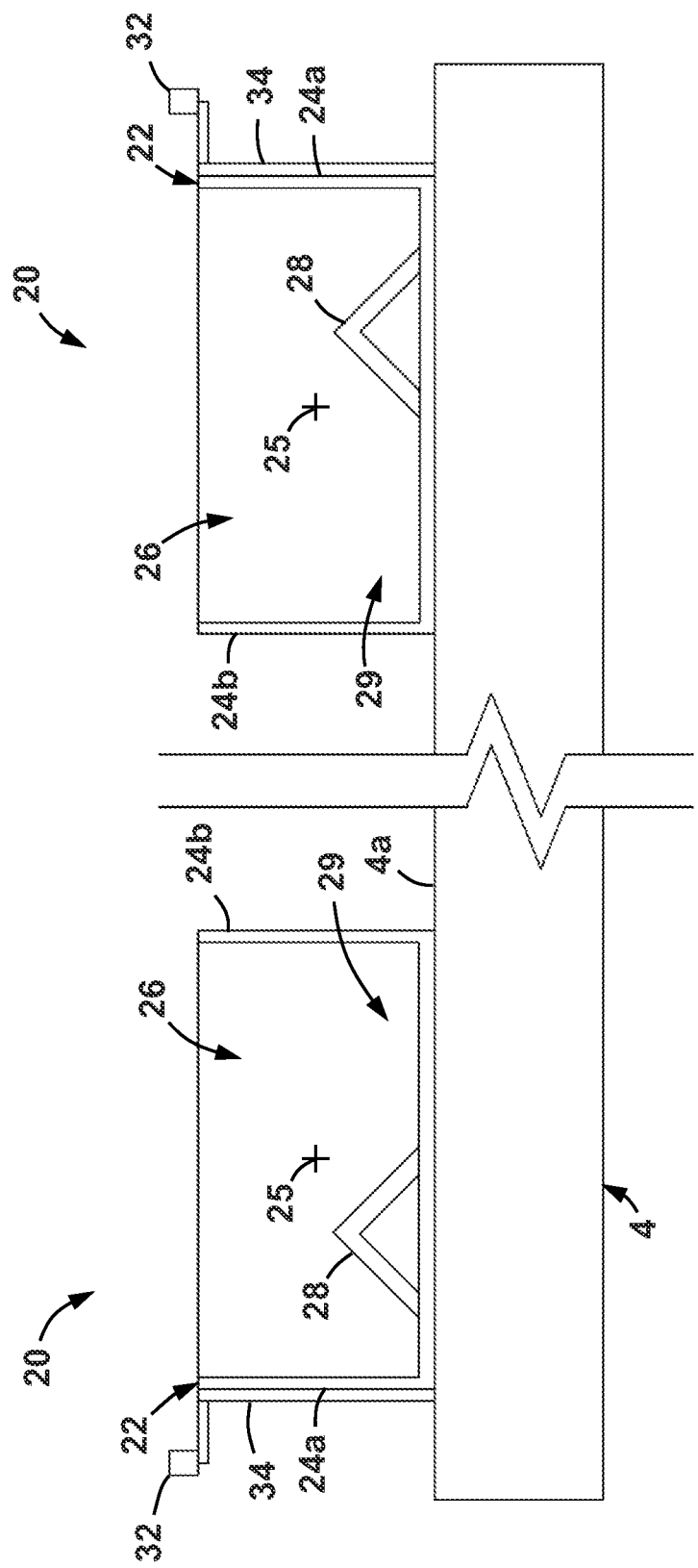
FIG. 3 a schematic front view of the rail assemblies of the construction system of FIG. 1 according to some embodiments.

[Referring now to FIGS. 2-3, in this embodiment, each rail assembly 20 is disposed on top surface 4a of foundation and includes a central axis 25, a first end 20a, and a second end 20b opposite first end 20a. Axes 25 of rail assemblies 20 are parallel and radially spaced from one another across top surface 4a such that first ends 20a and second ends 20b of rail assemblies 20 are generally aligned with one another across top surface 4a. In addition, each of the axes 25 of rail assemblies 20 extend parallel to axis 12 (and thus, each axis 25 also extends in a direction that is perpendicular to the direction of axis 14 and the direction of axis 16). As best shown in FIGS. 2 and 3, each rail assembly includes an elongate channel member 22 extending axially between ends 20a, 20b along axis 25 that includes a pair of axially extending walls 24 defining a recess 26 extending therebetween. In particular, elongate channel member 22 includes a first wall 24a, and a second wall 24b radially spaced from first wall 24a with respect to axis 25, so that recess 26 is disposed radially between walls 24a, 24b.

An axially extending elongate angle member 28 is secured (e.g., welded, bolted, riveted, etc.) within recess 26 between walls 24a, 24b. As will be described in more detail below, angle members 28 of rail assemblies 20 form tracks to guide movement of gantry 50 (and printing assembly 100) across foundation 4 along axis 12 during construction operations. As is best shown in FIG. 3, in this embodiment angle member 28 is radially positioned closer to first wall 24a than second wall 24b (i.e., angle member 28 is not equidistantly spaced between walls 24a, 24b within recess 26 in this embodiment). Thus, a space or clearance 29 is formed radially between angle member 28 and second wall 24b. As is also best shown in FIG. 3, channel members 22 of rail assemblies 20 are positioned along foundation such that second walls 24b radially face one another across top surface 4a, and first walls 24a radially face away from one another.

Figure 4:
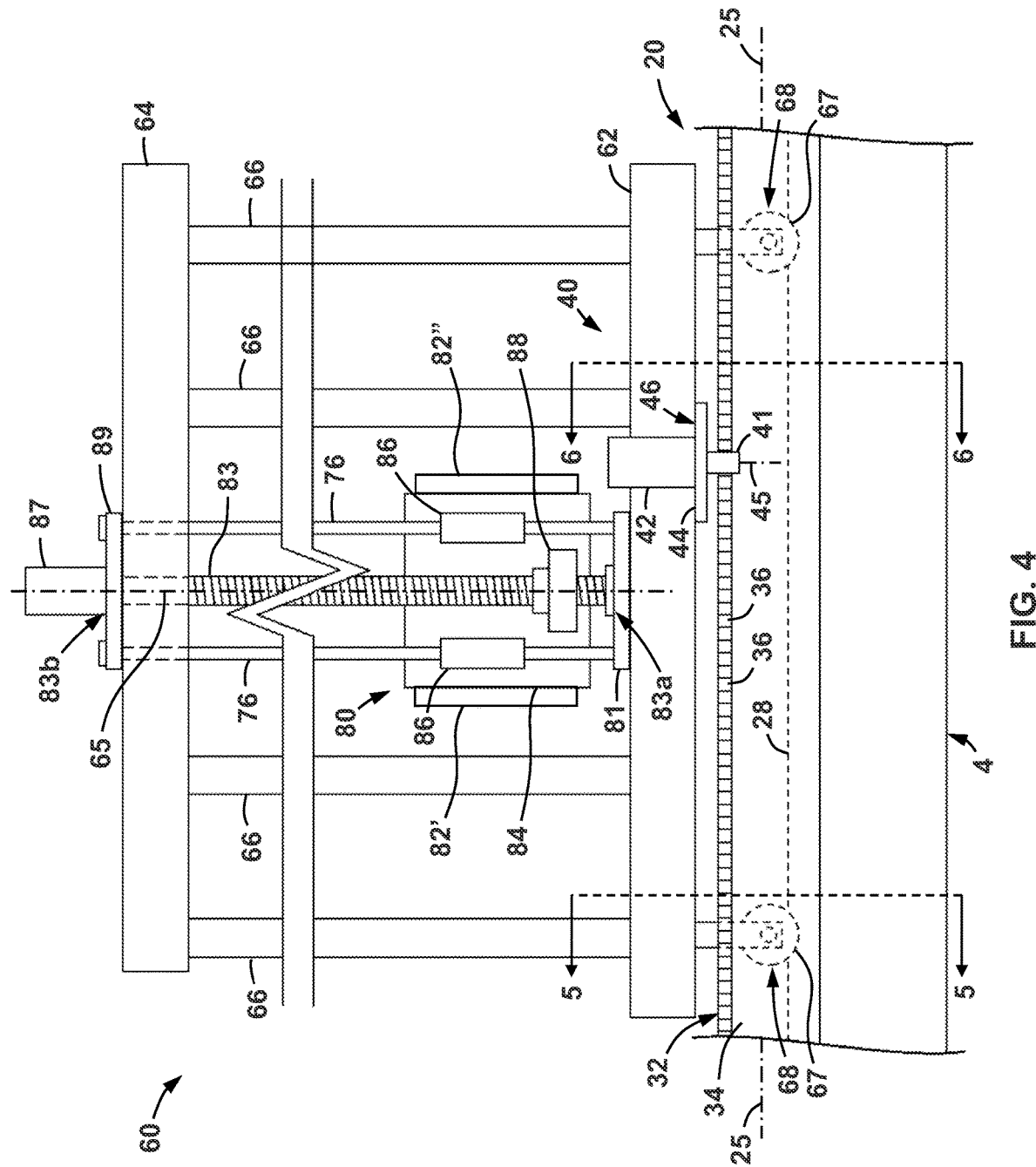
FIG. 4 is a schematic side view of one of the vertical support assemblies disposed on one of the rail assemblies of the construction system of FIG. 1 according to some embodiments.

Referring now to FIGS. 3 and 4, an elongate rack 32 is secured to first wall 24a of each rail assembly 20 via a corresponding frame 34. Accordingly, each rack 32 extends axially with respect to the corresponding axis 25 as well as axis 12. As best shown in FIG. 4, each rack 32 includes a plurality of teeth 36 that are axially adjacent one another along the corresponding rail assembly 20.

Referring again to FIGS. 1 and 2, gantry 50 generally includes a pair of vertical support assemblies 60, an upper bridge assembly 70 spanning between vertical support assemblies 60, and a trolley bridge assembly 80 also spanning between vertical support assemblies 60, below upper bridge assembly 70. As will be described in more detail below, each of the vertical support assemblies 60 is movably coupled to a corresponding one of the rail assemblies 20 so that vertical support assemblies 60 may traverse along axis 12 during operations. In addition, trolley bridge assembly 80 is movably coupled to each of the vertical support assemblies 60 so that trolley bridge assembly 80 may traverse along axis 16 during operations. Each of these components will now be described in more detail below.

Referring to FIG. 4, each vertical support assembly 60 includes a longitudinal axis 65, a first or lower support girder 62, and a second or upper support girder 64 axially spaced from lower support girder 62 along axis 65. In addition, vertical support assembly 60 includes a plurality of support legs 66 extending axially between girders 62, 64 with respect to axis 65. In this embodiment, axis 65 extends in the vertical direction, or along the direction of the force of gravity, and thus, axis 65 of each vertical support assembly 60 is parallel to axis 16, and support legs 66 of each vertical support assembly 60 extend vertically between the corresponding girders 62, 64.

Figure 5:
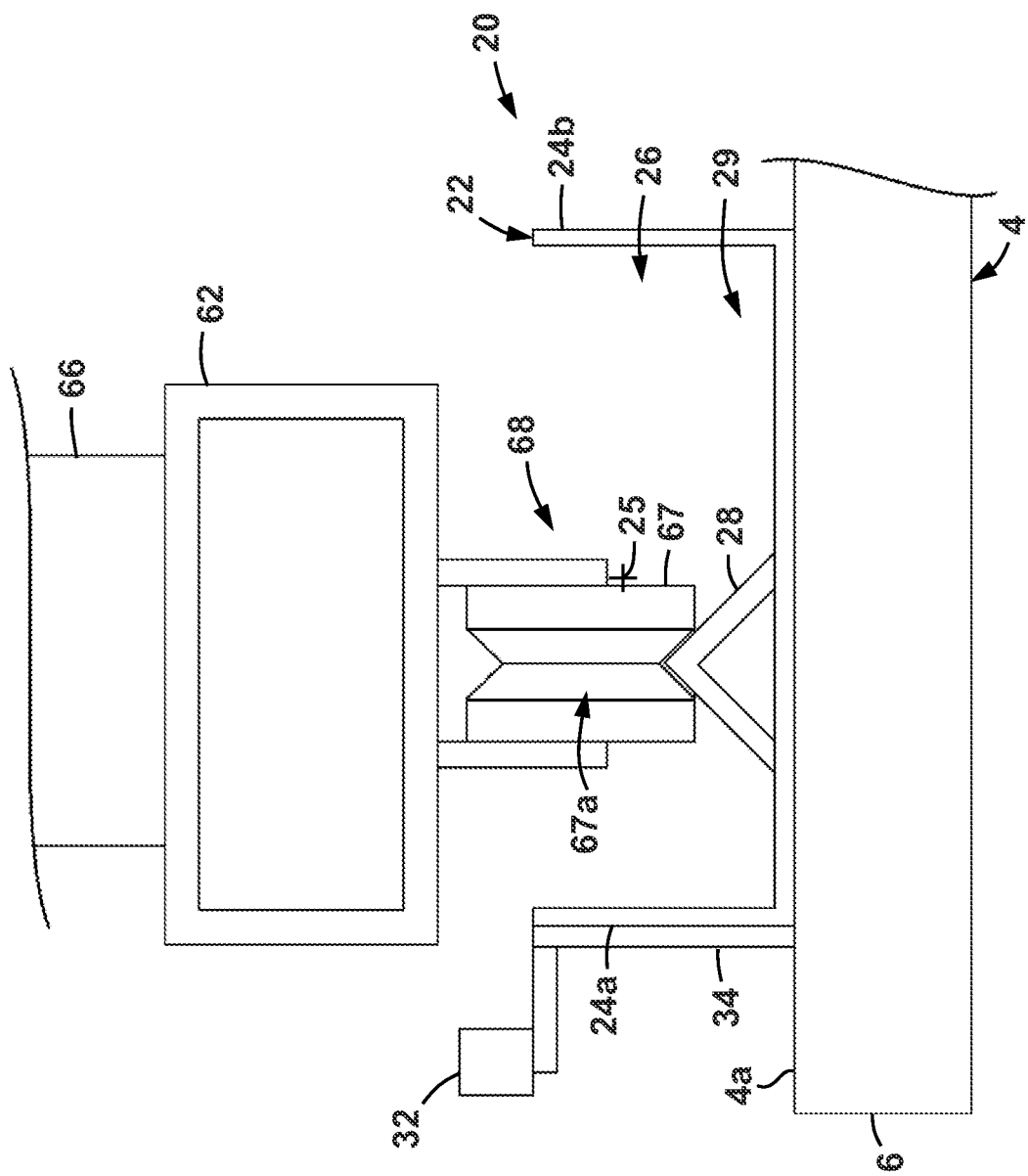
FIG. 5 is an enlarged schematic view of one of the wheel assemblies of the vertical support assembly of FIG. 4 coupled to the rail assembly of FIG. 4 according to some embodiments.

Referring still to FIG. 4, each vertical support assembly 60 further includes a pair of roller assemblies 68 coupled to lower support girder 62. Each roller assembly 68 includes a corresponding roller 67 that engages with angle member 28 within the corresponding rail assembly 20. More specifically, referring briefly to FIG. 5, each roller 67 includes a circumferential channel 67a, which in this embodiment is a v-shaped channel or groove extending circumferentially about roller 67. Channel 67a engages and mates with elongate angle member 28 of a corresponding one of the rail assemblies 20. Thus, during operations, each vertical support assembly 60 (and thus also gantry 50—See FIGS. 1 and 2) is configured to traverse axially with respect to axes 25 of rail assemblies 20 and axis 12 (see FIG. 2) along and relative to top surface 4a of foundation via rolling engagement between rollers 67 and elongate angle members 28.

Referring now to FIGS. 4, 6, and 7, a lateral actuation assembly 40 is coupled between each vertical support assembly 60 and the corresponding rail assembly (that is, there is a corresponding lateral actuation assembly 40 coupled between each vertical support assembly 60 and corresponding rail assembly 20 within construction system 10). However, it should be appreciated that in other embodiments, a single lateral actuation assembly 40 is coupled between a select one of the vertical support assemblies 60 and a corresponding one of the rail assemblies 20. Each lateral actuation assembly 40 generally comprises a driver 42 and a connection block assembly 46 for coupling driver to lower girder 62 of vertical support assembly 60.

Driver 42 includes an output shaft 41 and is configured to rotate shaft 41 about an axis 45 that extends in a direction that is generally perpendicular to the direction of axis 25 of the corresponding rail assembly 20 (however, it should be appreciated that such precise alignment may not exist in other embodiments). Driver 42 may comprise any suitable driver or prime mover for rotating output shaft 41 about axis 45, such as, for example, an electric motor, a hydraulic motor, a pneumatic motor, etc. In this embodiment, driver 42 comprises an electric motor (e.g., a servo motor). In addition, driver 42 is configured to rotate shaft 41 in either direction (e.g., clockwise, counterclockwise, etc.) about axis 45. As best shown in FIG. 7, shaft 41 includes a plurality of teeth 41a mounted thereto that are configured to mesh with the teeth 36 of rack 32 of the corresponding rail assembly 20 (see FIG. 4). Thus, teeth 41a of shaft 41 may form a pinion gear that is configured to mesh with the teeth 36 of rack 32.

Referring still to FIGS. 4, 6, and 7, connection block assembly 46 includes a first block or member 44 mounted to driver 42, a second block or member 48 mounted to lower girder 62, and a third block or member 47. First block 44 includes an aperture 43 (see FIG. 7) that receives shaft 41 of driver 42 therethrough along axis 45. In addition, second block 48 is secured to girder 62 by a plurality of bolts 48a. A plurality of connector studs 38 (or more simply "studs 38") extend through each of the first block 44, second block 48, and third block 47. In this embodiment, connector studs 38 extend through blocks 44, 48, 47 in a direction that is perpendicular to the directions of the axis of shaft 41 and the axis 25 of the corresponding rail assembly 20. Each stud 38 has a first end 38a, and a second end 38b opposite first end 38a. First block 44 is proximate first ends 38a of each stud 38, third block 47 is proximate second ends 38b of each stud 38, and second block 44 is disposed between blocks 44, 47.

In addition, studs 38 are fixed within first block 44 and third block 47 due to the engagement of nuts 39 about studs 38 on either side of blocks 44, 47. Accordingly, studs 38 may not move relative to blocks 44, 47 during operations. In other embodiments, some other technique may be used to fix studs 38 relative to blocks 44, 47 (e.g., threaded engagement of studs within blocks 44, 47, welding, etc.). In addition, in this embodiment, studs 38 may freely slide within and relative to second block 48. A biasing member 49 is disposed between second block 48 and third block 47. Biasing member 49 is configured to bias second block 48 away from third block 47 (or third block 47 away from second block 48) along studs 38. In this embodiment, biasing member 49 comprises a coiled spring; however, any suitable biasing member configured to linearly bias to members apart from one another may be used in other embodiments, such as, for example, a piston. Because studs 38 are fixed within first block 44 and third block 47, and are free to slide within second block 48 as previously described, biasing third block 47 from second block 48 along studs 38 also biases first block 44 toward second block 48. As best appreciated in FIG. 6, the biasing of first block 44 toward second block 48 further biases shaft 41 into engagement with rack 32 mounted to first wall 24a of the corresponding rail assembly 20. Accordingly, connection block assembly 46 is configured to bias teeth 41 mounted to shaft 41 into cooperative engagement with the corresponding teeth 36 on rack 32 of the corresponding rail assembly 20.

Referring again to FIGS. 2 and 4, during operations, driver 42 of each lateral actuation assembly 40 is selectively actuated rotate the corresponding shaft 41. Due to the engagement between teeth 41a of shafts 41 (see FIG. 7) and the teeth 36 of the corresponding racks 32 on rail assemblies 20, the rotation of shafts 41 about the corresponding axes 45 causes traversal of each vertical support assembly 60 axially along the corresponding rail assembly 20 with respect to axis 12. Accordingly, the actuation of drivers 42 causes movement or translation of gantry 50 along axis 12 relative to foundation 4.

Figure 8:
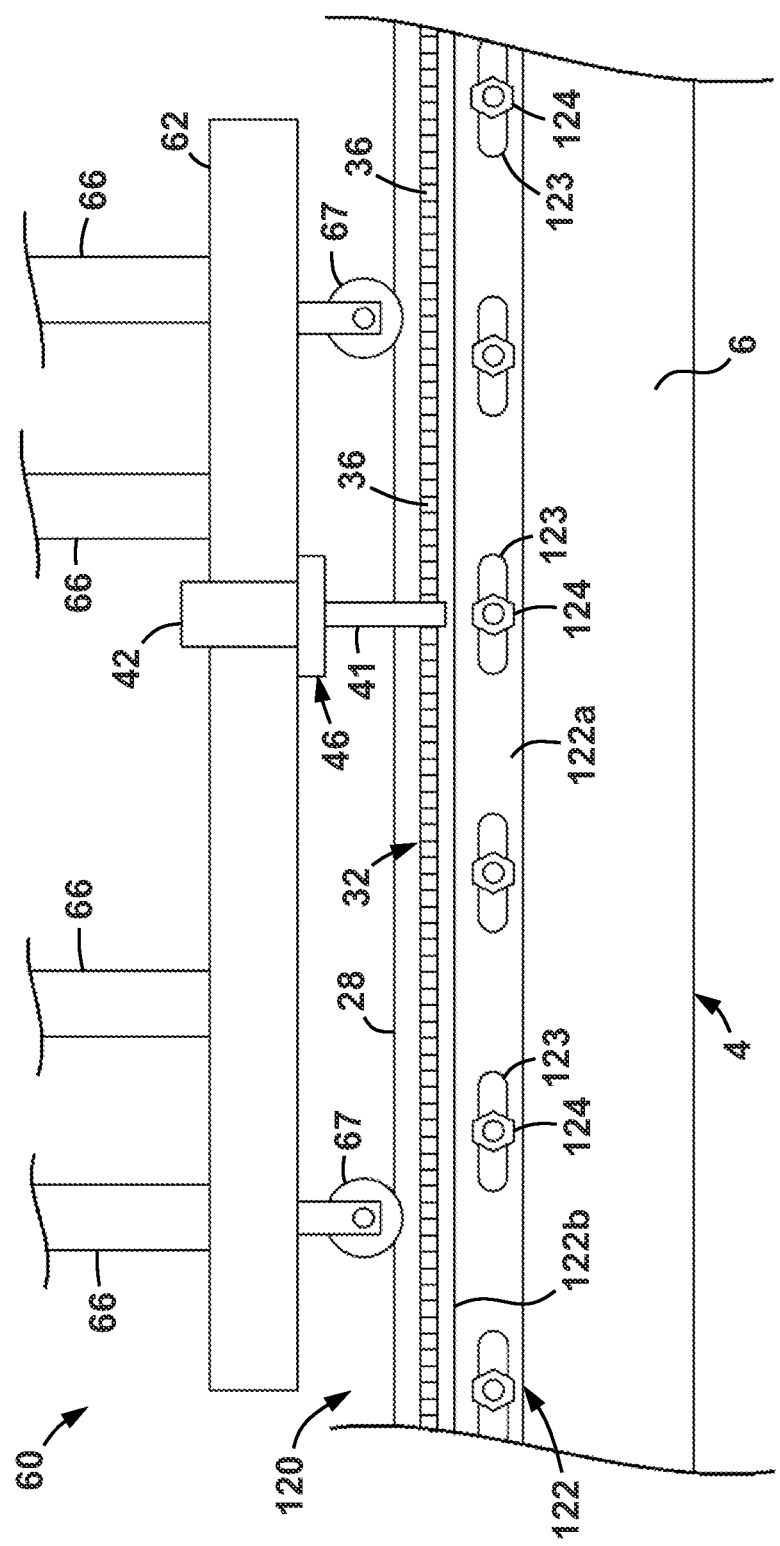
FIG. 8 is a schematic side view of one of the vertical support assemblies disposed on an alternative rail assembly of the construction system of FIG. 1 according to some embodiments.
Figure 9:
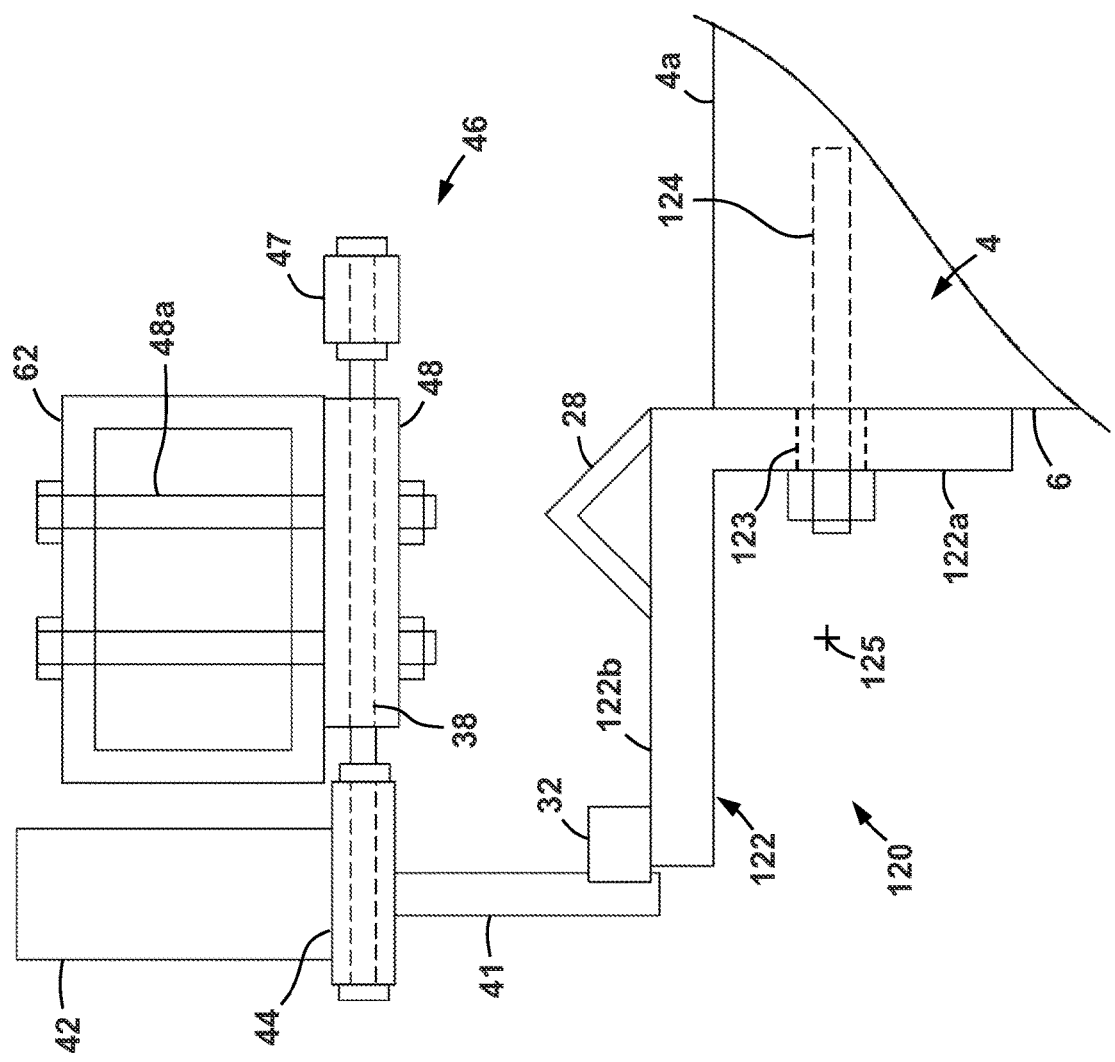
FIG. 9 is an enlarged, schematic front view of the rail assembly of the vertical support assembly coupled to the rail assembly of FIG. 8 according to some embodiments.

Referring now to FIGS. 8 and 9, while the embodiment of FIGS. 1-7 has included rail assemblies 20 that are secured to the top surface 4a of foundation 4, it should be appreciated that other embodiments of construction system 10 (see FIGS. 1 and 2) include rail assemblies that are mounted to other surfaces of foundation 4, such as, for example, the perimeter 6. In particular, FIGS. 8 and 9 depict another embodiment of rail assemblies 120 for supporting gantry 50 (see FIGS. 1 and 2) on foundation 4. Rail assemblies 120 each include a central axis 125 (that extends in the same direction as axis of rail assemblies 20 and thus is parallel to axis 12 shown in FIG. 2 as previously described) and an elongate angle member 122 in place of elongate channel member 22 (see FIG. 3). Elongate angle member 122 includes a first portion 122a and a second portion 122b extending perpendicularly from first portion 122a. First portion 122a includes a plurality of apertures 123 extending therethrough. In this embodiment, apertures 123 are slots that are elongated axially with respect to axis 125. Elongate angle member 122 is secured to foundation 4 by inserting bolts 124 or other suitable connection members through the apertures 123 and into perimeter 6 of foundation 4. Accordingly, once elongate angle member 122 is secured to perimeter 6 of foundation 4, second portion 122b of angle member 122 extends parallel to and may be flush with top surface 4a of foundation 4.

Rack 32 and elongate angle member 28, both of which are the same as previously described above, are coupled to second portion 122b of elongate angle member 122. Thus, as best shown in FIG. 8, rollers 67 of vertical support assembly 60 are engaged with elongate angle member 28 in the same manner as described above, and shaft 41 of driver 42 is meshed or engaged with the teeth 36 of rack 32 in the same manner as described above. Further, connection block assembly 46 is configured to bias shaft 41 into engagement with rack 32 via lower girder of vertical support assembly 60 in the same manner as previously described above. Thus, the traversal of gantry 50 (see FIGS. 1 and 2) (including vertical support assemblies 60) along axis 12 across top surface 4a utilizing rail assemblies 120 is substantially the same as that described above for rail assemblies 20, and a detailed description of these operations is omitted in the interest of brevity. However, it should be appreciated that by use of rail assemblies 120 that are mounted to perimeter 6 of foundation 4, all (or substantially all) of top surface 4a is available for the construction of a structure (e.g., structure 5 shown in FIG. 1).

Referring back now to FIG. 2, upper bridge assembly 70 includes a pair of girders 72 that are mounted to and span between upper girders 64 of vertical support assemblies 60. In particular, each girder 72 includes a first end 72a and a second end 72b opposite first end 72a. The first end 72a of each girder 72 is mounted or secured to the upper girder 64 of one vertical support assemblies 60, and the second end 72b of each girder 72 is mounted or secured to upper girder 64 of the other vertical support assembly 60. In this embodiment, each girder 72 extends in a direction that is parallel to axis 14; however, such precise alignment is not achieved in some embodiments. In addition, upper bridge assembly 70 further includes a plurality of cross-braces 74, each extending between a corresponding one of the girders 72 to a corresponding one of the support legs 66 of vertical support assemblies 60. Accordingly, vertical support assemblies 60 are secured to one another via upper bridge assembly 70, so that each of the vertical support assemblies 60 are moved together about top surface 4a of foundation 4 along axis 12 during printing operations.

Referring still to FIG. 2, trolley bridge assembly 80 includes a pair of girders 82', 82" (namely a first girder 82' and a second girder 82") coupled to and spanning between vertical support assemblies 60. In addition, printing assembly 100 is movably coupled to girders 82', 82". As will be described in more detail below, girders 82', 82" of trolley bridge assembly 80 are movably coupled to vertical support assemblies 60, such that girders 82', 82" may traverse along axis 16 during operations. In addition, printing assembly 100 is movably coupled to girders 82', 82" such that printing assembly 100 is configured to traverse along axis 14 between girders 82', 82" during operations.

Figure 10:
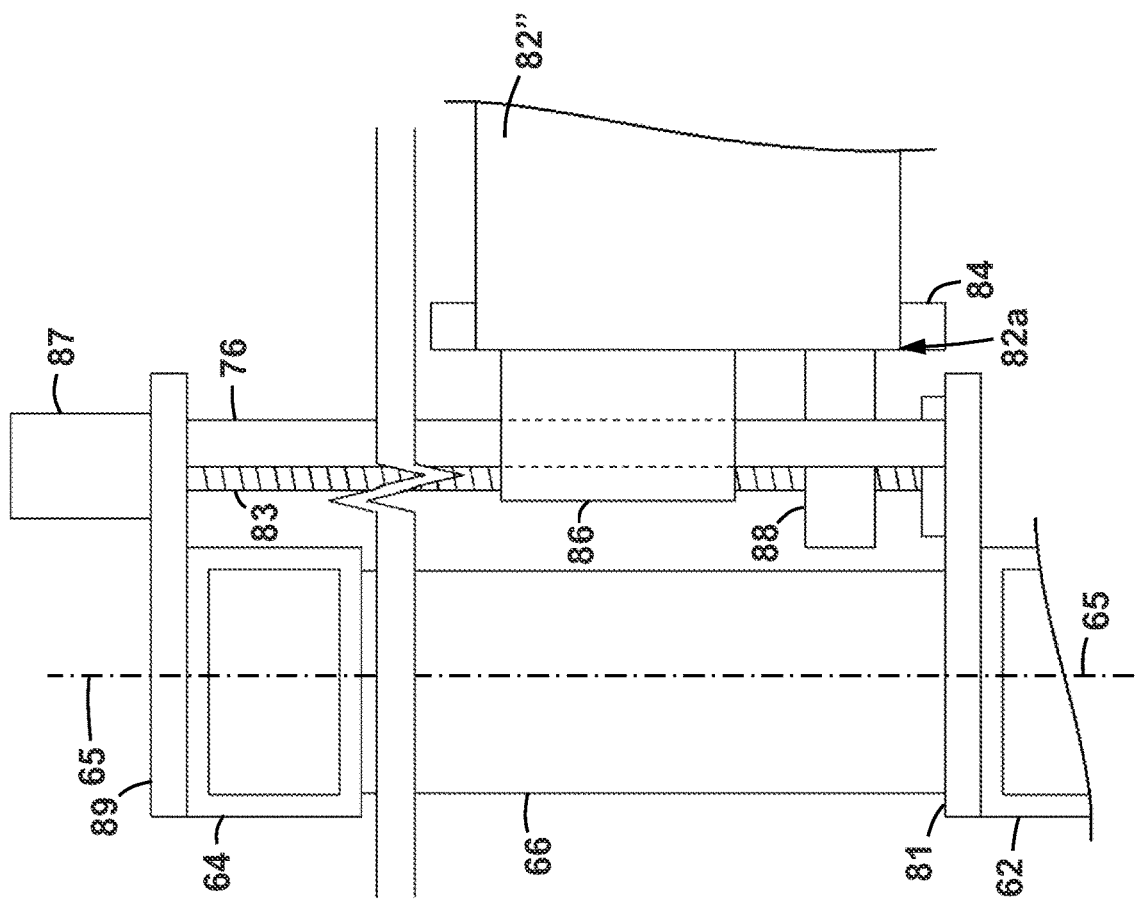
FIG. 10 is a front schematic view of the vertical support assembly of FIG. 4 according to some embodiments.

Referring now to FIGS. 2, 4, and 10, each girder 82', 82" includes a first end 82a, and a second end 82b opposite first end 82a. First ends 82a of girders 82', 82" are coupled to one of the vertical support assemblies 60, and second ends 82a of girders 82', 82" are coupled to the other vertical support assembly 60. FIGS. 4 and 10 depict the coupling between first ends 82a of girders 82', 82" and one of the vertical support assemblies 60; however, it should be appreciated that second ends 82b of girders 82', 82" are coupled to the other vertical support assembly 60 in the same manner.

As shown in FIGS. 4 and 10, first ends 82a of girders 82', 82" are each mounted to a connection bracket 84. In this embodiment, connection bracket 84 comprises a plate and includes a pair of support sleeves 86 and a threaded collar 88 mounted thereto. A threaded rod 83 extends axially with respect to the vertically oriented axis 65 of vertical support assembly 60 between lower girder 62 and upper girder 64 of vertical support assembly 60. Thus, threaded rod 83 also extends axially with respect to axis 16 (see FIG. 2). Threaded rod 83 includes a first or lower end 83a mounted to lower girder 62 via a mounting plate 81, and a second or upper end 83b cooperatively engaged within a driver 87 that is mounted to upper girder 64 via a mounting plate 89. A plurality of support rods 76 also extend axially between mounting plates 81, 89 with respect to axis 65. Threaded rod 83 is threadably engaged within threaded collar 88 (i.e., threaded collar 88 includes internal threads that engage and mesh with the external threads extending about threaded rod 83). In addition, support rods 76 are slidably received within support sleeves 86 on connection bracket 84.

Driver 87 may comprise any suitable driver or prime mover, such as previously described above for driver 42. In this embodiment, driver 87 comprises an electric motor (e.g., a servo motor) that is configured to rotate threaded rod 83 in either a clockwise or counterclockwise direction about a central or longitudinal axis (not shown) of rod 83 (note: the longitudinal axis of rod 83 may extend parallel to axis 65). As a result, the coupling between threaded rod 83 and mounting plate 81 may include any suitable bearing(s) or other support device(s) configured to support the rotation of threaded rod 83 relative to plate 81 during operations. During operations, driver 87 selectively rotates threaded rod 83 as previously described above so that threaded rod 83 rotates within threaded collar 88. Because collar 88 is threadably engaged with threaded rod 83 as previously described, the rotation of threaded rod 83 within collar 88 causes collar 88, connection bracket 84, and girders 82', 82" to translate axially between ends 83a, 83b along axis 65 (and axis 16). In addition, the axial movement of connection bracket 84, and girders 82', 82" is further guided by the sliding engagement between support rods 76 and support sleeves 86. Accordingly, the actuation of drivers 87 is configured to translate trolley bridge assembly 80 and printing assembly 100 along axis 16 during operations.

Figure 11:
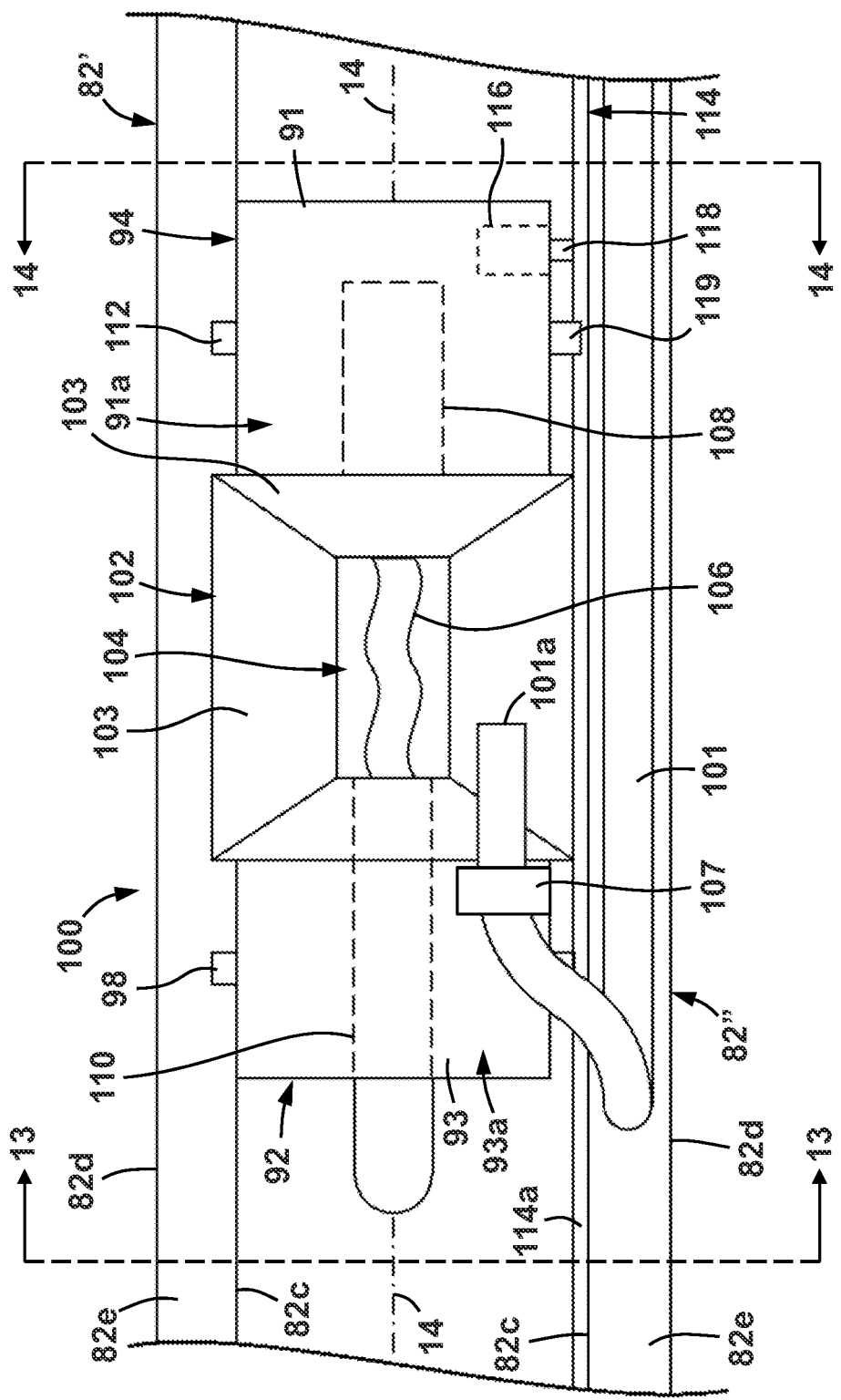
FIG. 11 is a top view of the printing assembly of the construction system of FIG. 1 according to some embodiments.

Referring now to FIGS. 2 and 11, printing assembly 100 is coupled to girders 82', 82" and is configured to move or translate between ends 82a, 82b of girders 82', 82" along axis 14 during operations. Generally speaking, printing assembly 100 is movably supported between girders 82 via a pair of trolley members 92, 94.

Figure 12:
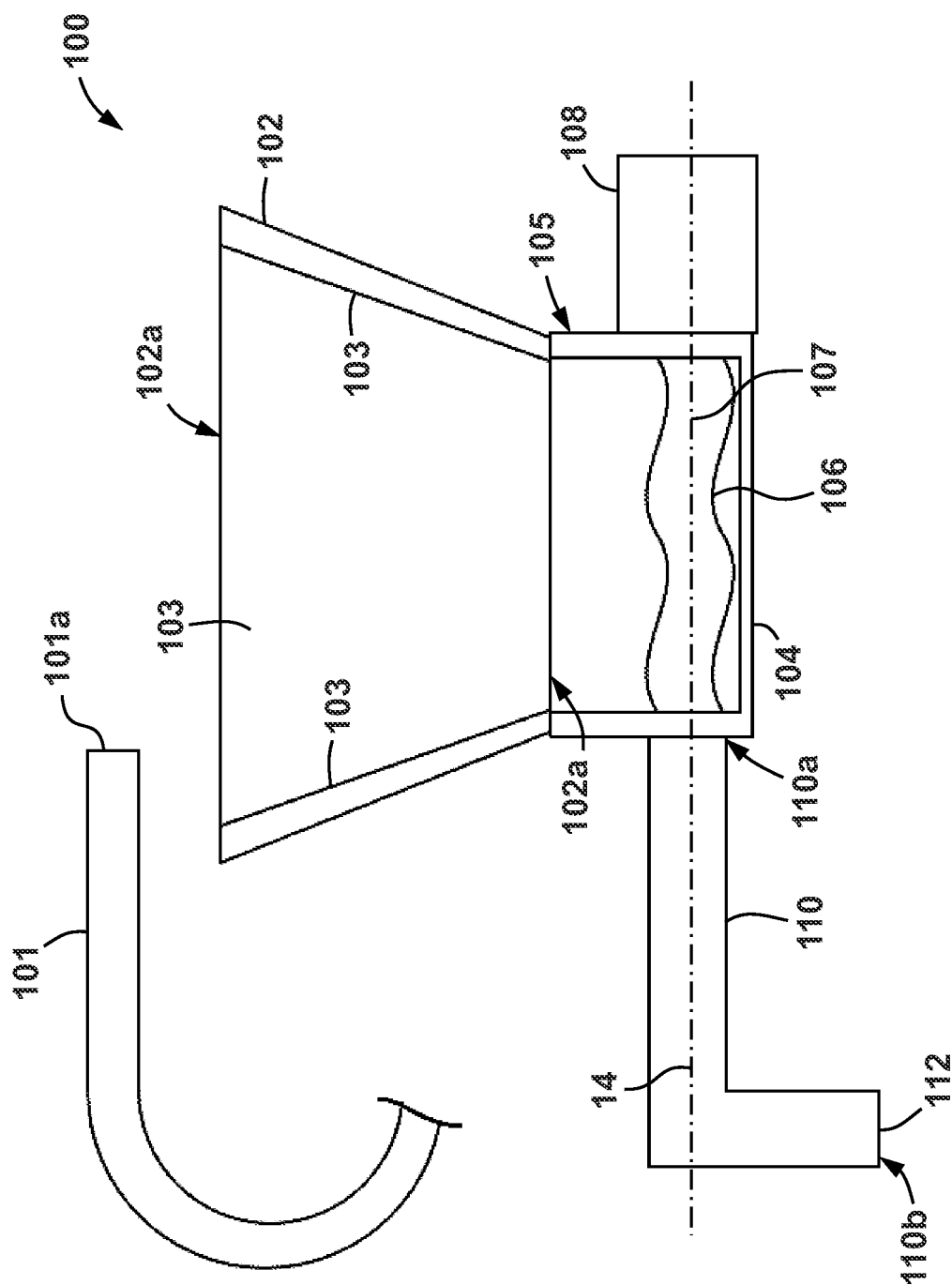
FIG. 12 is a schematic side view of the printing assembly of FIG. 11 according to some embodiment.
Figure 13:
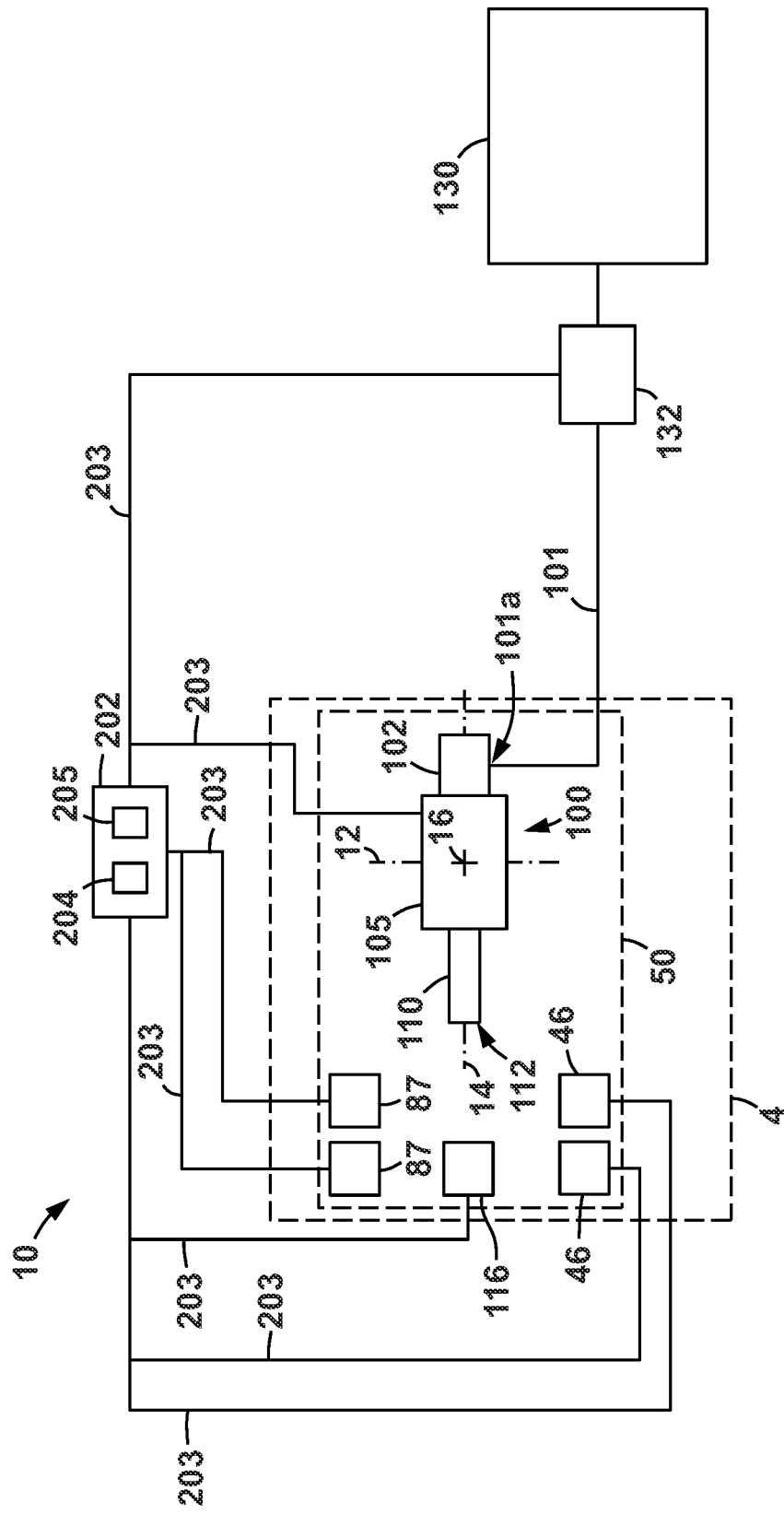
FIG. 13 is a diagram of the construction system of FIG. 1 according to some embodiments.

Referring now to FIGS. 11-13, printing assembly 100 generally includes a supply conduit 101, a hopper 102, a pump assembly 105, and an outflow conduit 110. As best shown in FIG. 13, supply conduit 101 is configured to deliver an extrudable building material (e.g., a cement mixture) from a source 130, which may comprise any suitable tank or vessel that is configured to contain a volume of extrudable building material therein. For example, in some embodiments, source 130 may comprise a tank, a cement mixer (e.g., such as that found on a stand-alone cement mixer or on a cement truck), or other suitable container. Source 130 may be disposed immediately adjacent foundation 4 and gantry 50, or may be relatively remote from foundation 4 and gantry 50.

In this embodiment, conduit 101 comprises a hose; however, other suitable conduits or channels for delivering the extrudable building material from the source 130 may be used in other embodiments (e.g., pipes, open channels, tubing, etc.). Supply conduit 101 includes an outlet 101a that is disposed above hopper 102 so that cement emitted from outlet 101a is provided into hopper 102 during operations.

As best shown in FIG. 12, hopper 102 includes a first or upper end 102a, and a second or lower end 102b opposite upper end 102a. In addition, hopper 102 includes a plurality of converging walls 103 that converge toward one another moving from upper end 102a to lower end 102b. As a result, extrudable building materials that is emitted into to hopper 102 (e.g., from outlet 101a of supply conduit 101) is funneled or channeled toward lower end 102b by converging walls 103 under the force of gravity.

As is also best shown in FIG. 12, pump assembly 105 is coupled to lower end 102b of hopper 102 and includes a pump housing 104, a screw 106 disposed within housing 104, and a driver 108 coupled to screw 106. While not specifically shown, screw 106 includes one or more helical blades that engage with extrudable building material disposed within housing 104. Driver 108 may comprise any suitable driver or prime mover, such as previously described above for drivers 42, 87. In this embodiment, driver 108 comprises an electric motor that is configured to rotate screw 106 within pump housing 104 to advance extrudable building material within housing 104 into outflow conduit 110.

Outflow conduit 110 is fluidly coupled to pump housing 104 at a proximal end 110a and includes a second or distal end 110b extending away from pump housing 104. Distal end 110b includes an outlet 112. In some embodiments, outlet 112 may comprise a nozzle or other flow control device.

Referring still to FIGS. 11-13, during operations, an extrudable building material is flowed from source 130 via a pump 132 (see FIG. 13) that is proximate source 130 and adjacent (and potentially distal) to foundation 4. The building material is then conducted along supply conduit 101 and emitted from outlet 101a into hopper 102. The converging walls 103 of hopper 102 channel the extrudable building material down toward lower end 102b of hopper 102 such that the building material then enters pump housing 104 and surrounds screw 106. Driver 108 rotates screw 106 such that the helical blades (not specifically shown) of screw 106 engage with and advance the building material within pump housing 104 toward outflow conduit 110. Thereafter, the extrudable building material flows through outflow conduit 110 and out of outlet 112 at distal end 110*b*, so that is may be deposited at a desired location along foundation 4 (or on previously deposited or printed building material).

Referring again to FIG. 11, trolley members 92, 94 are disposed about printing assembly 100 and are configured to support printing assembly 100 between girders 82', 82" during operations. First trolley member 92 is disposed about outflow conduit 110, and second trolley member 94 is disposed about driver 108. Thus, in this embodiment, trolley members 92, 94 are disposed on axially opposing sides of hopper 102 along axis 14.

Referring now to FIGS. 11, 14, and 15, in addition to ends 82*a*, 82*b* (see FIGS. 2 and 10), as depicted in FIGS. 11 and 13, girders 82', 82" also each include an inner side 82*c*, and outer side 82*d*, a top side 82*e*, and a bottom side 82*f*. Each of the sides 82*c*, 82*d*, 82*e*, and 82*f* extend axially between the ends 82*a*, 82*b* of the corresponding girder 82', 82" with respect to axis 14. Girders 82', 82" extend parallel to one another along axis 14 such that inner sides 82*c* face one another, and outer sides 82*d* face away from one another. In addition, printing assembly 100 suspended between inner sides 82*c* of girders 82', 82" via trolley members 92, 94.

Referring specifically now to FIGS. 11 and 14, first trolley member 92 is disposed between inner sides 82*c* of girders 82', 82" and includes an outer housing 93 that defines an inner cavity or space 96. Outer housing 93 includes a first or upper side 93*a* that is proximate upper side 82*e* of girders 82', 82", and a second or lower side 93*b* that is opposite upper side 93*a* and is proximate lower side 82*f* of girders 82', 82". In addition, outer housing 93 includes a first lateral side 93*c* extending between upper and lower sides 93*a* and 93*b*, respectively, and a second lateral side 93*d* also extending between upper and lower sides 93*a* and 93*b* and opposite first lateral side 93*c*. Thus, first lateral side 93*c* is proximate the inner side 82*c* of first girder 82' and second lateral side 93*d* is proximate the inner side 82*c* of second girder 82". As shown in FIG. 11, a support bracket 107 is mounted to upper side 93*a* of trolley member 93 to support supply conduit 101 above hopper 102 (note: supply conduit 101 and bracket 107 are omitted from FIG. 14 so as to simplify the figure).

Cavity 96 receives outflow conduit 110 therethrough. A conduit support member or bracket 97 is mounted to frame member 92 within cavity 96 that engages with outflow conduit 110. Thus, outflow conduit 110 is supported by outer housing 93 of trolley member 92 via bracket 97. In addition, a plurality of first or upper rollers 98 extend from lateral sides 93*c*, 93*d* and engage with upper sides 82*e* of girders 82', 82", and a plurality of second or lower rollers 99 extend from lateral sides 93*c*, 93*d* and engage with lower sides 82*d* of girders 82', 82". As will be described in more detail below, rollers 98, 99 are configured to freely rotate relative to outer housing 93. Accordingly, during operations trolley member 92 may traverse along axis 14 between girders 82', 82" via rolling engagement of rollers 98 along upper sides 83*e*, and rolling engagement of rollers 99 along lower sides 82*f*.

Referring specifically to FIGS. 11 and 15, second trolley member 94 is also disposed between inner sides 82*c* of girders 82', 82" and includes an outer housing 91 that defines an inner cavity or space 120. Outer housing 91 includes a first or upper side 91*a* that is proximate upper side 82*e* of girders 82', 82", and a second or lower side 91*b* that is opposite upper side 91*a* and is proximate lower side 82*f* of girders 82', 82". In addition, outer housing 91 includes a first lateral side 91*c* extending between upper and lower sides 91*a* and 91*b*, respectively, and a second lateral side 91*d* also extending between upper and lower sides 91*a* and 91*b* and opposite first lateral side 91*c*. Thus, first lateral side 91*c* is proximate the inner side 82*c* of first girder 82' and second lateral side 91*d* is proximate the inner side 82*c* of second girder 82".

Cavity 120 receives driver 108 of printing assembly 100. A driver support member or bracket 111 is mounted to frame member 94 within cavity 95 that engages with driver 108. Thus, driver 108 is supported by outer housing 91 of trolley member 94 via bracket 111. An elongate rack 114 is mounted to the inner side 82*c* of second girder 82" such that rack 114 extends axially with respect to axis 14. Specifically, in this embodiment rack 114 is mounted to the inner side 82*c* of second girder 82" proximate second lateral side 91*d* of trolley frame member 94. Rack 114 has a first or upper side 114*a* and a second or lower side 114*b* opposite upper side 114*a*. Upper side 114*a* of rack 114 is more proximate upper side 82*e* than lower side 82*f* of the second girder 82", and lower side 114*b* of rack 114 is more proximate the lower side 82*f* than the upper side 82*e* of second girder 82". Lower side 114 includes a plurality of axially adjacent teeth 113 (note: only one tooth 113 is shown with a hidden line in FIG. 15).

Referring still to FIGS. 11 and 15, a first or upper roller 112 extends from first lateral side 91*c* of outer housing 91 and engages with upper side 82*e* of first girder 82'. In addition, a second or lower roller 109 also extends from lateral side 91*c* of outer housing 91 and engaged with lower side 82*f* of first girder 82'. Further, a third roller 119 extends from second lateral side 91*d* of outer housing 91 and engages with upper side 114*a* of rack 114. As will be described in more detail below, rollers 112, 109, 119 are configured to freely rotate relative to outer housing 91. Accordingly, during operations trolley member 94 may traverse along axis 14 between girders 82', 82" via rolling engagement of roller 112 along upper side 83*e* of first girder 82', rolling engagement of roller 109 along lower side 82*f* of first girder 82', and rolling engagement of roller 119 along upper side 114*a* of rack 114.

A driver 116 is mounted to second lateral side 91*d* of trolley frame member 94. Driver 116 includes an output shaft 118 and is configured to rotate shaft 118 about an axis 115 that extends in a direction that is generally perpendicular to the direction of axis 14 (however, it should be appreciated that such precise alignment may not exist in other embodiments). Specifically, driver 116 is disposed within cavity 120 of trolley frame member 94 and shaft 118 extends through an aperture 117 in first lateral side 91*d* along axis 115 toward rack 114.

Driver 116 may comprise any suitable driver or prime mover, such as previously described above for drivers 42, 87, 108. In this embodiment, driver 116 comprises an electric motor (e.g., a servo motor). In addition, driver 116 is configured to rotate shaft 118 in either direction (e.g., clockwise, counterclockwise, etc.) about axis 115. While not specifically shown in FIG. 15, shaft 118 includes a plurality of teeth mounted thereto (e.g., similar to teeth 41*a* mounted to shaft 41 as shown in FIG. 7) that are configured to mesh with the teeth 113 of rack 114 mounted to second girder 82". Thus, the teeth (not shown) of shaft 118 may form a pinion gear that is configured to mesh with rack 114.

Referring now to FIGS. 11, 14, and 15, during operations, driver 116 rotates shaft 118 about axis 115 to selectively engage the teeth on shaft 118 with the teeth 113 on rack 114 to translate or propel printing assembly 100 along axis 14 between ends 82a, 82b of girders 82', 82". The movement or translation of printing assembly 100 along axis 14 further facilitated by rolling engagement of rollers 98, 99, 112, 109, 119 and girders 82', 82" as previously described above.

Referring again to FIGS. 2 and 11, supply conduit 101 is supported on upper side 83e of second girder 82". As printing assembly 100 moves or traverses between girders 82', 82" along axis 14, outlet 101a of conduit 101 is translated along with conduit 101 via the engagement with support bracket 107 on first trolley member 92. Thus, during these operations, the remaining portions of conduit 101 are allowed to bend and flex to accommodate the movement of printing assembly 100 and outlet 101a along axis 14. In some embodiments, additional cable shielding or other compliant conduit support track may be disposed about supply conduit 101 so as to facilitate and control the radius of curvature imparted to supply conduit 101 during these operations. In addition, while not specifically shown, it should be appreciated that additional cables or conduits may also be routed alongside supply conduit 101. For example, in some embodiments, electrical cabling (e.g., cabling for routing electrical power and/or control signals to drivers 108, 116) may also be routed alongside supply conduit 101 (and thus also routed through any cable shielding or support track as described above).

Referring again to FIGS. 1 and 2, during a construction operation, printing assembly 100 is traversed along axes 12, 14, 16 about foundation 4 via gantry 50 and rail assemblies 20. Simultaneously, printing assembly 100 is actuated (e.g., via pump assembly 105) to extrude or deposit building material (e.g., a cement mixture) in a plurality of vertically stacked layers thereby forming structure 5. In particular, during these operations printing assembly 100 is traversed along the axis 12 via actuation of drivers 46 and the engagement between teeth 41a on shafts 41 and elongate racks 32 mounted on rail assemblies 20 (see FIG. 4). In addition, printing assembly 100 is traversed along axis 14 via actuation of driver 116 and the engagement between the teeth on shaft 118 and the elongate rack 114 mounted to second girder 82" of trolley bridge assembly 80 (see FIG. 11). Further, printing assembly 100 is traversed along the axis 16 via actuation of drivers 87 and the threaded engagement between threaded rods 83 and the corresponding threaded collars 88 on trolley bridge assembly 80 (see FIG. 4). Thus, the selective actuation of drivers 46, 116 (see FIGS. 4 and 11) causes printing assembly 100 to be controllably maneuvered within a plane that is parallel to top surface 4a of foundation 4, and the selective actuation of drivers 87 causes printing assembly 100 to be controllably translated vertically (or along axis 16).

Referring again to FIG. 13, the actuation of drivers 46, 116, 87 (see FIGS. 4 and 11) may be monitored and controlled by a central controller 202. Controller 202 may comprise any suitable device or assembly which is capable of receiving an electrical or informational signal and transmitting various electrical, mechanical, or informational signals to other devices (e.g., valve 201, pump assembly 105, etc.). In particular, in this example, controller 202 includes a processor 204 and a memory 205. The processor 204 (e.g., microprocessor, central processing unit, or collection of such processor devices, etc.) executes machine readable instructions provided on memory 205 to provide the processor 204 with all of the functionality described herein. The memory 205 may comprise volatile storage (e.g., random access memory), non-volatile storage (e.g., flash storage, read only memory, etc.), or combinations of both volatile and non-volatile storage. Data consumed or produced by the machine readable instructions can also be stored on memory 205. A suitable power source may also be included within or coupled to controller 202 to provide electrical power to the components within controller 202 (e.g., processor 204, memory 205, etc.). The power source may comprise any suitable source of electrical power such as, for example, a battery, capacitor, a converter or a local power grid, etc.

Controller 202 may be coupled to each of the drivers 87, 116, 46 via a plurality of communication paths 203. Communication paths 203 may comprise any suitable wired (e.g., conductive wires, fiber optic cables, etc.) or wireless connection (e.g., WIFI, BLUETOOTH®, near field communication, radio frequency communication, infrared communication, etc.). In this embodiment, communications paths 203 comprise conductive wires that are configured to transmit power and/or communication signals during operations. In addition, as shown in FIG. 13, controller 202 is also coupled to each of the pump assembly 105 and pump 132 via additional conductive paths 203.

During operations, controller 202 selectively actuates drivers 87, 116, 46 to controllably maneuver printing assembly 100 along each of the axes 12, 14, 16, as previously described. In addition, controller 202 also actuates pump assembly 105 and pump 132 to controllably emit extrudable building material from outlet 112 of outflow conduit 110 as previously described. Specifically controller 202 selectively maneuvers printing assembly 100 along axes 12, 14, 16 and emits building material from outlet 112 per machine readable instructions (e.g., software) that is stored on memory 205 and executed by processor 204. Embodiments of the machine readable instructions are discussed in more detail below; however, it should be appreciated that by executing the machine readable instructions, layers of cement are deposited on foundation 4 such that a structure (e.g., structure 5) is formed or printed vertically from foundation upward via construction system 10. Referring briefly to FIGS. 1 and 2, in this embodiment, controller 202 may be disposed within an storage cabinet 209 that is mounted or secured to one of the vertical support assemblies 60 of gantry 50. However, it should be appreciated that the location of controller 202 may be varied in other embodiments.

Figure 16:
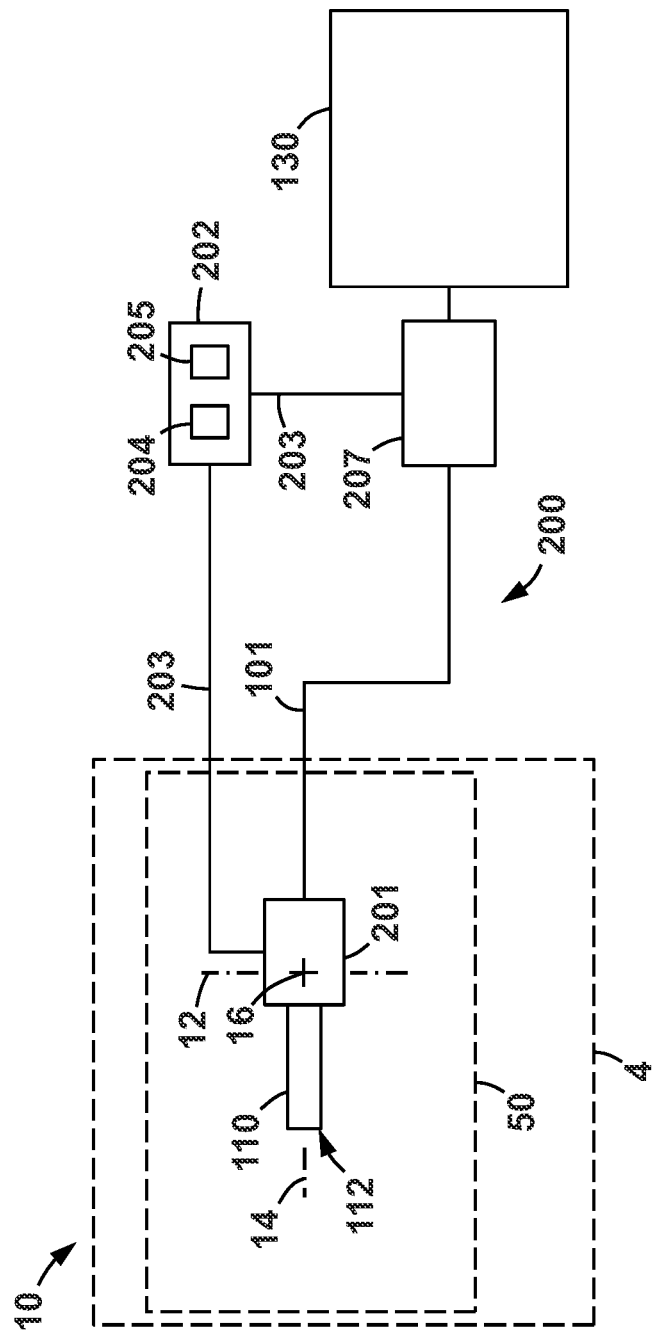
FIG. 16 is a diagram of the construction system of FIG. 1 according to some embodiments.

Referring now to FIGS. 16, in the embodiments described above pump assembly 105 of printing assembly 100 is maneuvered carried by gantry 50 along axes 12, 14, 16 to deposit controlled layers of extrudable building material to form a structure (e.g., structure 5) (see FIGS. 1, 2, 11, and 13). Without being limited to this or any other theory, by placing pump assembly 105 proximate to outflow conduit 110, relatively fine control both of the flow rate and the timing of initiation and cessation of flow of building material from outlet 112 may be exercised. Thus, cement may be deposited on foundation 4 with a high level of precision.

However, in other embodiments, it may be desirable to locate the pump assembly 105 (and also hopper 102) distal to gantry 50, so that gantry 50 need not carry the additional weight imparted by these components during a construction operation. For example, referring now to FIG. 16, another embodiment of printing assembly 200 is shown coupled to gantry 50 of construction system 10. Printing assembly 200 is substantially the same as printing assembly 100, and thus, shared components are shown with like reference numerals in FIG. 16 and the discussion below will focus on the features of printing assembly 200 that are different from printing assembly 100. In addition, many features of construction system 10 are not shown in FIG. 16, since they are not pertinent to the discussion of printing assembly 200.

However, it should be appreciated that such un-depicted features would also be included within construction system 10 in the same manner as described above. Therefore, the simplified depiction in FIG. 16 is merely mean to simplify the figure and associated text.

As shown in FIG. 16, printing assembly 200 includes outflow conduit 110 and a pump assembly 207 that is disposed adjacent foundation 4 (or distal thereto) and therefore is not carried on gantry 50 along with outflow conduit 110. Pump assembly 207 may be similar or the same as pump assembly 105 in some embodiments. However, in other embodiments, pump assembly 207 may be any other suitable pump(s) for pressurizing and delivering an extrudable building material from source 130 to outflow conduit 110 along supply conduit 101. It should be appreciated that pump 132 is omitted in this embodiment due to the placement of pump assembly 207.

In addition, printing assembly 200 includes a valve 201 disposed between outflow conduit 110 and pump assembly 207 along supply conduit 101. In this embodiment (such as shown in FIG. 16), valve 201 is disposed along supply conduit 101 proximate outflow conduit 110 and outlet 112. In other embodiments, valve 201 may be disposed within or along outflow conduit 110 and may be proximate outlet 112. Regardless, valve 201 and outflow conduit 110 are carried by gantry and are maneuvered along axes 12, 14, 16 by construction system 10 in substantially the same manner as described above for printing assembly 100.

Valve 201 is an actuatable member that is configured to selectively close off or adjust the flow of extrudable building material to outflow conduit 110 from pump assembly 207. In some embodiments, valve 201 comprises a pinch valve; however, other valve designs or arrangement may be used in other embodiments (e.g., ball valve, gate valve, butterfly valve, etc.). Valve 201 may be actuated between a fully open position, where valve 201 has little to no effect on the flow rate of building material flowing between pump assembly 207 and outflow conduit 110, and a fully closed position, where valve 201 prevents all extrudable building material from progressing to outflow conduit 110 from pump assembly 207 via supply conduit 101. In addition, valve 201 may also be actuated to a plurality of positions that are between the fully open and fully closed positions to progressively adjust the flow of building material between pump assembly 207 and outflow conduit 110. Further, in this embodiment, valve 201 is pneumatically actuated with compressed air; however, other actuation methods are possible, such as, for example, electrical actuation, hydraulic actuation, mechanical actuation, or some combination thereof.

Referring still to FIG. 16, controller 202 (previously described) is communicatively coupled to each of the valve 201 and pump assembly 207 via conductive paths 203, which are the same as previously described above (and thus may be any suitable wireless or wired connection(s)). During operations, controller 202 may actuate valve 201 (e.g., via a compressed air or other actuation system) to a desired position—including the fully closed position, the fully open position, or any of the plurality of positions between the fully open position and fully closed position. In some embodiments, controller 202 is configured to actuate valve 201 based on a number of factors, such as, for example, the operating status of pump assembly 207, the portion of the structure (e.g., structure 5 shown in FIG. 1) that is to be constructed (e.g., printed), the length of supply conduit 101 between pump assembly 207 and valve 201 (and/or outflow conduit 110), etc.

Without being limited to this or any other theory, the actuation of valve 201 may allow for precise control of the outflow of extrudable building material from outflow conduit 110 during operations even though pump assembly 207 is not disposed on gantry 50. For example, referring now to FIGS. 16 and 17, a method 210 for actuating valve 201 within printing assembly 200 is shown. Method 210 may be practiced wholly or partially by controller 202 (e.g., by processor 204 executing machine readable instructions stored on memory 205) within printing assembly 200. As a result, continuing reference is made to printing assembly 200 shown in FIG. 16 in describing the features of method 210 of FIG. 17. However, it should be appreciated that other assemblies, systems, and/or personnel may be used to carry out method 210 in other embodiments. Thus, in describing method 210, any reference to the actions or functions of controller 202 or the features of printing assembly 200 are merely meant to explain or describe particular embodiments of method 210 and should not be interpreted as limiting all possible embodiments of method 210.

Initially method 210 begins at 212 by activating a pump assembly (e.g., pump assembly 205) to initiate the flow of an extrudable building material (e.g., a cement mixture) from a source (e.g., source 130) toward an outflow conduit (e.g., outflow conduit 110) of a printing assembly (e.g., printing assembly 200) for printing a structure (e.g., structure 5 of FIG. 1). In some embodiments, a central controller (e.g., controller 202) may be utilized to activate the pump assembly; however, other activation methods may be used in other embodiments. For example, personnel or a separate controller may be used to activate the pump assembly and thus initiate the flow of building material toward the outflow conduit.

Next, method 210 includes waiting for a predetermined period of time after activating the pump assembly at 214. For example, with reference to printing assembly 200, block 214 may include waiting for a sufficient amount to allow building material to flow through supply conduit 101 and reach valve 201, so that subsequent flow of cement from outlet 112 may be more precisely controlled by the actuation of valve 201. In some embodiments, the predetermined period of time may be previously determined and stored on memory 205, or may be calculated or determined each time the pumping of cement is initiated at 212. In addition, the predetermined period of time from 214 may be calculated or determined based on a number of different factors and variables. For example, the predetermined period of time may be a function of the viscosity of the extrudable building material being conveyed by the pump assembly (e.g., pump assembly 207), the length of a supply conduit (e.g., supply conduit 101) between the pump assembly and the outflow conduit (or a valve deposed therealong such as valve 201), the diameter of the supply conduit, the flow rate of building material from the pump assembly, the local temperature and humidity, etc.

Referring still to FIG. 17, after waiting the predetermined period of time at 214 (i.e., after the predetermined period of time has elapsed), method 210 next proceeds to actuate a valve disposed proximate an outlet of the outflow conduit (e.g., valve 201) from a fully closed position to an open position at 216. In some embodiments, the open position in 216 may be a fully open position for the valve or a position between the fully open position and the fully closed position. The determination of specifically which opening position (or opening degree) to place valve in at 216 may be influenced by a number of factors, such as, the desired flow rate of extrudable building material from the outlet (e.g., outlet 112), the viscosity of the building material, the movement rate of printing assembly (e.g., movement via gantry 50), etc.

Referring still to FIGS. 16 and 17, when performing method 210 with printing assembly, waiting the predetermined amount of time at block 214 allows the flow of building material from outlet 112 of outflow conduit 110 to be more precisely timed at block 216. Specifically, the delay at block 214 may be sufficient to allow extrudable building material to flow along supply conduit 101 from pump assembly 207 to valve 201 so that there is little to no delay between the opening of valve at block 216 and the ultimate outflow or deposition of the building material. In addition, in some embodiments, controller 202 may wait the predetermined period of time at block 214 to allow to allow gantry 50 to maneuver outflow conduit 110 of printing assembly 200 (e.g., along axis 12, 14, 16) to the desired location on foundation 4 prior to initiating the flow of building material from outlet 112.

Referring now to FIG. 18, another method 220 for actuating valve 201 within printing assembly 200 is shown. As with method 210 previously described, method 220 may be practiced by controller 202 (e.g., by processor 204 executing machine readable instructions stored on memory 205) within printing assembly 200. As a result, continuing reference is made to FIG. 16 in describing the features of method 220 in FIG. 18. However, it should be appreciated that other assemblies, systems, and/or personnel may be used to carry out method 220 in other embodiments. Thus, in describing method 210, any reference to the actions or functions of controller 202 or the features of printing assembly 200 are merely meant to explain or describe particular embodiments of method 210 and should not be interpreted as limiting all possible embodiments of method 210.

Initially, method 220 begins by stopping the pumping of extrudable building material toward an outflow conduit mounted to a printing assembly for printing a structure at 222. For example, in the printing assembly 200 of FIG. 16, block 222 may include stopping the pumping of building material from pump assembly 207 (e.g., either by controller 202 or some other actuation method as previously described above). In some embodiments, the stopping of pumping with pump assembly 207 may be desirable at the cessation of printing operations (either temporarily or permanently) or at the ending of a movement of the printing assembly 200 along foundation 4 (e.g., along one or more of the axes 12, 14, 16).

Next, method 220 includes actuating a valve disposed proximate an outlet of the outflow conduit (e.g., valve 201) from an open position to a fully closed position at 224. With reference to printing assembly 200, in some embodiments the actuation of valve 201 at 224 is carried out as quickly as possible after stopping the pumping of extrudable building material from pump assembly 207. For example, in some embodiments, the actuation of valve 201 at 224 may be carried out simultaneously, or nearly simultaneously with the stopping of pumping of building material with the pump assembly 207 at 222. In other embodiments, the actuation of valve 201 may be carried out after a second predetermined period of time, following the stopping of pumping of building material from pump assembly 207. Without being limited to this or any other theory, it may be desirable to quickly actuate valve 201 to the fully closed position at 224 after stopping the pumping of building material from the pump assembly 105 so that the additional cement that is still within supply conduit 101 between pump assembly 207 and valve 201 does not flow onto foundation 4. Thus, by quickly closing valve 201 (e.g., via controller 202), the cessation of extrudable building material flow from outlet 112 may be more precisely controlled during operations. In other embodiments, controller 202 may close valve 201 while pump assembly 207 continues to operate.

While embodiments disclosed herein have utilized gantry 50 to support and maneuver a printing assembly (e.g., printing assembly 100,200) about a foundation 4 for the additive manufacturing (e.g., 3D printing) of a structure (e.g., structure 5) (see FIGS. 1 and 2), it should be appreciated that other embodiments of gantry 50 may be utilized in other embodiments. In particular, in some embodiments, gantry (e.g., gantry 50) may be collapsible in at least one dimension. Without being limited to this or any other theory, collapsing gantry (or other support and actuation structure for the printing assembly) may facilitate transportation of the construction system 10 (e.g., between job sites or between a job site a storage facility) and the storage of construction system 10 when not in use.

Figure 19:
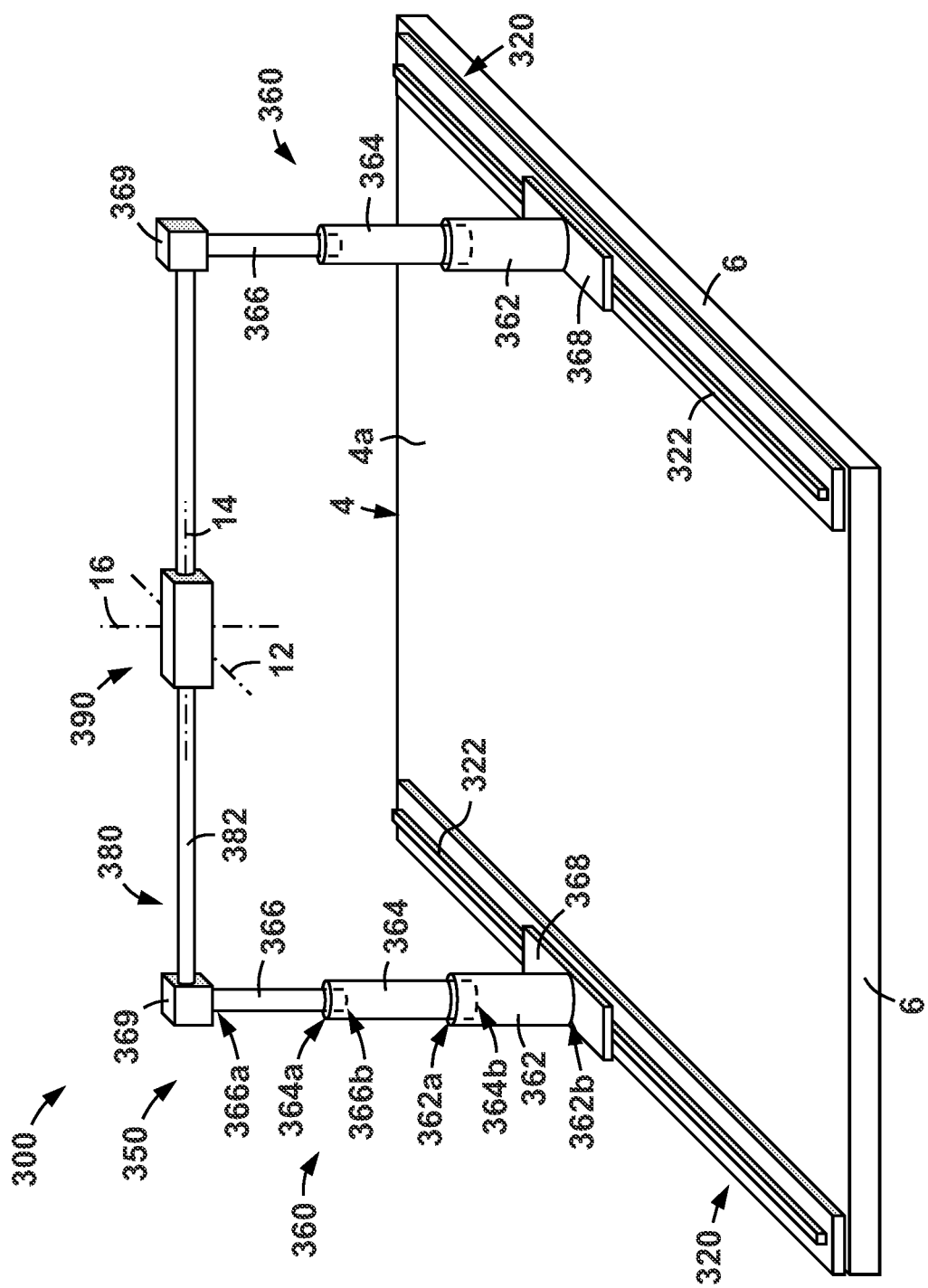
FIG. 19 is a schematic, perspective view of a construction system according to some embodiments.

For example, referring now to FIG. 19, another construction system 300 for constructing a structure (e.g., structure 5) via 3D printing is shown. Construction system 300 is similar to construction system 10 in a number of ways, and thus, the focus of the following description and figures will be on the features and elements of construction system 300 that are different from construction system 10. Generally speaking, construction system 300 includes a gantry 350 that movably supports a printing assembly 390 above top surface 4a of foundation 4. Printing assembly 390 may be the same or similar to printing assembly 100 and/or 200, previously described above. For example, in some embodiments, printing assembly 390 (or the portion of printing assembly 390 that is directly supported by gantry 350) may comprise an outflow pipe and valve similar to outflow conduit 110 and valve 201 previously described above (see FIG. 16). However, printing assembly 390 may comprise a variety of different components and assemblies that are configured to controllably emit or deposit an extrudable building material onto foundation 4 during construction operations. In addition, as previously described above for gantry 50, during operations gantry 350 may be actuated to maneuver printing assembly 390 along one or more of the axes 12, 14, 16 relative to foundation 4.

Gantry 350 includes a pair of rail assemblies 320, a pair of vertical support assemblies 360, and a trolley bridge assembly 380. Rail assemblies 320 may be similar to rail assemblies 20, 120 previously described, and thus many of the details of rail assemblies 320 are not discussed or depicted in great detail herein. Generally speaking, rail assemblies comprise a rail 322 to provide a track or path for gantry 350 to move along axis 12. In some embodiments, rail 322 may be formed from an elongate angle member (such as angle member 28 previously described see FIG. 3).

Referring still to FIG. 19, each vertical support assembly 360 includes a lower girder 368 that is movably supported on a corresponding one of the rail assemblies 320 via one or more roller assemblies (e.g., such as like roller assemblies 68 previously described above). During operations, each vertical support assembly 360 may be actuated or driven axially along rail assemblies 320 with respect to axis 12. For example, vertical support assemblies 360 may be driven along rail assemblies 320 by an actuatable rack and pinion system (e.g., such as driver 46, shaft 41, and rack 32 previously described above).

In addition, each vertical support assembly 360 comprises a plurality of telescoping vertical pistons—namely a first or lower piston 362, a second or middle piston 364, and a third or upper piston 366. Each of the pistons 362, 364, 366 is an elongate member that includes a first or upper end 362a, 364a, 366a, respectively, and a second or lower end 362b, 364b, 366b, respectively, opposite upper end 362a, 364a, 366a, respectively. Further, pistons 362, 364, 366 are axially coupled to one another in a direction that is parallel to axis 16. Specifically, lower end 366b of upper piston 366 is axially received within upper end 364a of middle piston 364, and lower end 364b of middle piston 364 is axially received within upper end 362a of lower piston 362. During operations, middle piston 364 may be axially actuated (again in a direction that is parallel to axis 16) into and out of lower piston 362, and upper piston 366 may be similarly axially actuated into and out of middle piston 364. Thus, the axial actuation of pistons 362, 364, 366 may controllably adjust a vertical height of vertical support assemblies 360. Any suitable mechanism or system may be used to axially actuate pistons 362, 364, 366, such as, for example, a hydraulic actuation system, an electric actuation system, a pneumatic actuation system, or some combination thereof.

Referring still to FIG. 19, the lower end 362b of lower piston 362 is coupled to lower girder 368, and the upper end 366a of upper piston 366 is coupled to a mounting block 369. Thus, the axial actuation of pistons 362, 364, 366 may adjust or change an axial spacing or distance between lower girder 368 and mounting block 369 during operations.

Trolley bridge assembly 380 may comprise one or more support girders 382 that extend between mounting blocks 369 of vertical support assemblies 360 along a direction that is parallel to axis 14. Girder(s) 382 may be the same or similar to girders 82 in some embodiments. In addition, printing assembly 390 may be movably supported by girder(s) 382. For example, printing assembly 390 may be supported by girder(s) 382 in a similar manner to that described above for printing assembly 100 and girders 82. In addition, printing assembly 390 may be actuated to traverse along girder(s) 382 and axis 14. In some embodiments, printing assembly 390 may be driven along girder(s) 382 by an actuatable rack and pinion system (e.g., such as driver 116, shaft 118, and rack 114 previously described above).

Construction or printing operations with construction system 300 are substantially the same as that described above for construction system 10. However, in addition to these general operations, upon the completion of construction operations, gantry 350 may be collapsed vertically (or along axis 16) by telescoping each vertically support assembly 360 axially downward. Specifically, each vertical support assembly 360 may be vertically collapsed by actuating upper piston 362 into middle piston 364, and by actuating middle piston 364 into lower piston 362. Without being limited to this or any other theory, the axial collapse of vertical support assemblies 360 may facilitate the transportation of gantry 350 within a standard shipping container (or other suitable container) without the need to fully disassemble gantry 350.

Figure 20:
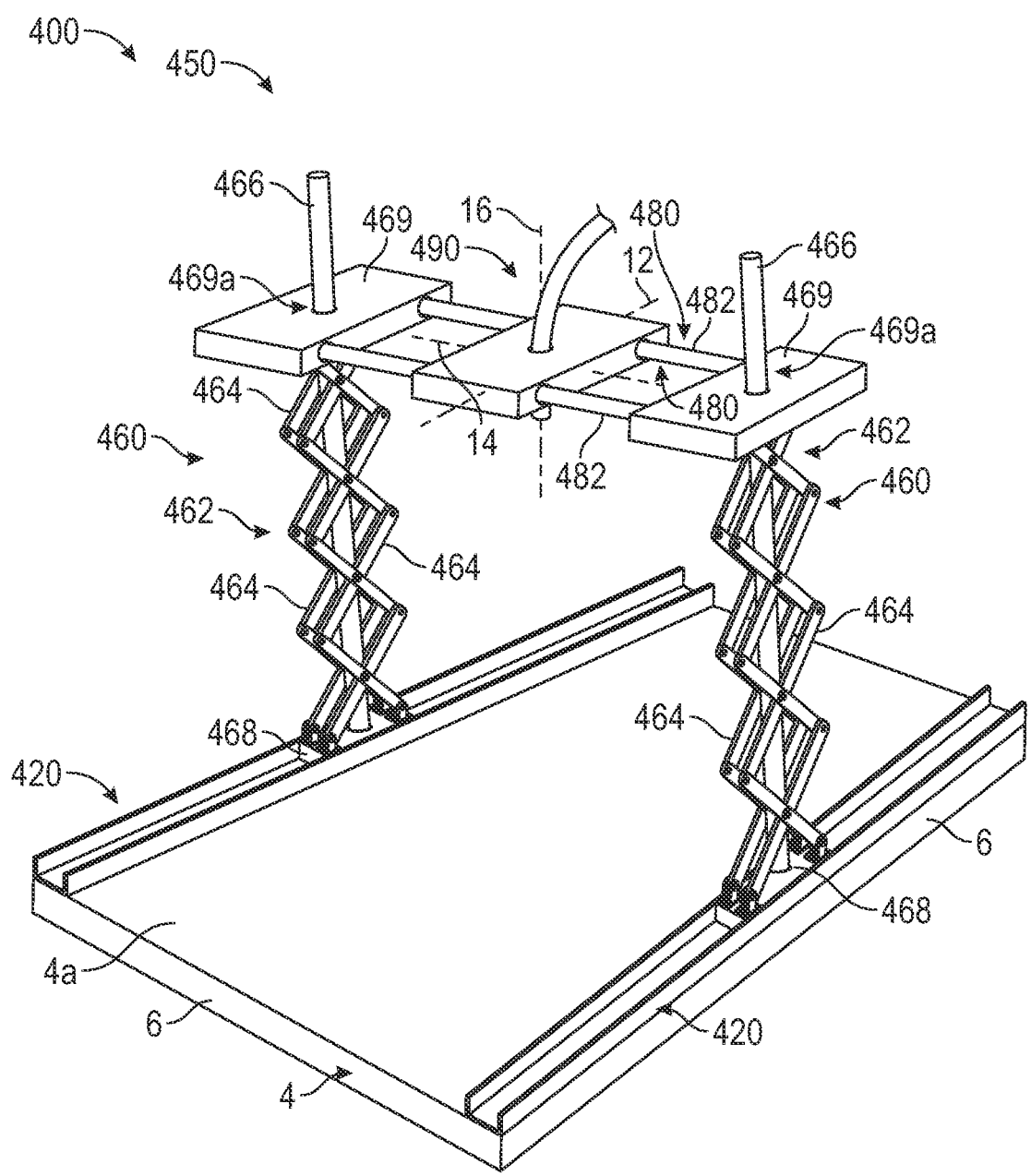
FIG. 20 is a schematic, perspective view of a construction system according to some embodiments.

Referring now to FIG. 20, another construction system 400 for constructing a structure (e.g., structure 5) via 3D printing is shown. Construction system 400 is similar to construction systems 10 and 300 in a number of ways, and thus, the focus of the following description and figures will be on the features and elements of construction system 400 that are different from construction systems 10, 300. Generally speaking, construction system 400 includes a gantry 450 that movably supports a printing assembly 490 above top surface 4a of foundation 4. Printing assembly 490 may be the same or similar to printing assembly 100, 200, 390, previously described above. For example, in some embodiments, printing assembly 490 (or the portion of printing assembly 490 that is directly supported by gantry 450) may comprise an outflow pipe and valve similar to outflow conduit 110 and valve 201 previously described above (see FIG. 16). However, printing assembly 490 may comprise a variety of different components and assemblies that are configured to controllably emit or deposit an extrudable building material onto foundation 4 during construction operations. In addition, as previously described above for gantry 50, during operations gantry 450 may be actuated to maneuver printing assembly 490 along one or more of the axes 12, 14, 16 relative to foundation 4.

Gantry 450 includes a pair of rail assemblies 420, a pair of vertical support assemblies 460, and a trolley bridge assembly 480. Rail assemblies 420 may be similar to rail assemblies 20, 120, 320 previously described, and thus many of the details of rail assemblies 420 are not discussed in great detail herein. Generally speaking, rail assemblies 420 comprise a rail (not shown in FIG. 20) to provide a track or path for gantry 450 to move along axis 12. In some embodiments, the rail (not shown) may be formed from an elongate angle member (such as angle member 28 previously described—see FIG. 3).

Referring still to FIG. 20, each vertical support assembly 460 includes a lower girder 468 that is movably supported on a corresponding one of the rail assemblies 420 via one or more roller assemblies (e.g., such as like roller assemblies 68 previously described above). During operations, each vertical support assembly 460 may be actuated or driven axially along rail assemblies 420 with respect to axis 12. For example, vertical support assemblies 460 may be driven along rail assemblies 420 by an actuatable rack and pinion system (e.g., such as driver 46, shaft 41, and rack 32 previously described above).

In addition, each vertical support assembly 460 comprises a mounting block 469, and a scissor lift assembly 462 coupled between lower girder 468 and mounting block 469. Scissor lift assembly 462 comprises a plurality of linking members 464 that are pivotably coupled to one another at the respective ends. During operations, hydraulic pistons or other suitable actuators (not shown) may selectively rotate linking members 464 relative to one another about their respective ends to axially raise or lower mounting block 469 relative to lower girder 468. A central guide post 466 may be disposed within scissor lift assembly 462 and extend axially with respect to axis 16 between lower girder 468 and mounting block 469. During operations, mounting block 469 may sliding engage with guide post 466, via a central aperture 469a, as mounting block 469 is raised or lowered via actuation of scissor lift assembly 464 to ensure a substantially axial movement of mounting block 469 with respect to axis 16.

Trolley bridge assembly 480 may comprise one or more support girders 482 that extend between mounting blocks 469 of vertical support assemblies 360 along a direction that is parallel to axis 14. Girders 482 may be the same or similar to girders 82 in some embodiments. In addition, printing assembly 490 may be movably supported by girders 482. For example, printing assembly 490 may be supported by girders 482 in a similar manner to that described above for printing assembly 100 and girders 82. In addition, printing assembly 490 may be actuated to traverse along girders 482 and axis 14. In some embodiments, printing assembly 490 may be driven along girders 482 by an actuatable rack and pinion system (e.g., such as driver 116, shaft 118, and rack 114 previously described above).

Construction or printing operations with construction system 400 are substantially the same as that described above for construction system 10. However, as is similarly described above for gantry 350, in addition to general operations, upon the completion of construction operations, gantry 450 may be collapsed vertically (or along axis 16) by controllably lowering or collapsing vertical support assemblies 460. In particular, vertical support assemblies 460 may be collapsed by pivoting linking members 464 within scissor lift assemblies 462 relative to one another to axially collapse mounting block 469 toward lower girder 468. Without being limited to this or any other theory, the axial collapse of vertical support assemblies 460 may facilitate the transportation of gantry 450 within a standard shipping container (or other suitable container) without the need to fully disassemble gantry 450.

In the manner described, a construction system (e.g., construction systems 10, 300, 400, etc.) may be utilized to construct a structure (e.g., structure 5) via an additive manufacturing method, such as, for example 3D printing. Accordingly, by use of the construction systems disclosed herein, the time and materials required to construct a structure may be reduced.

Next, systems and methods will be described for the design and construction of a structure (e.g., structure 5) with the construction systems described herein (e.g., construction systems 10, 300, 400). As a result, the systems and methods described herein are directed to the design and construction of a structure via an additive manufacturing process (e.g., 3D printing). In addition, as will be described in more detail below, any or all of the methods described herein may be practiced either partially or wholly by a computing device (e.g., controller 202) or a plurality of computing devices. Thus, in some embodiments, the some or all of the methods described herein may be partially or wholly deployed as machine readable instructions, such as, for example, non-transitory computer readable medium that is executable by a computing device.

Figure 21:
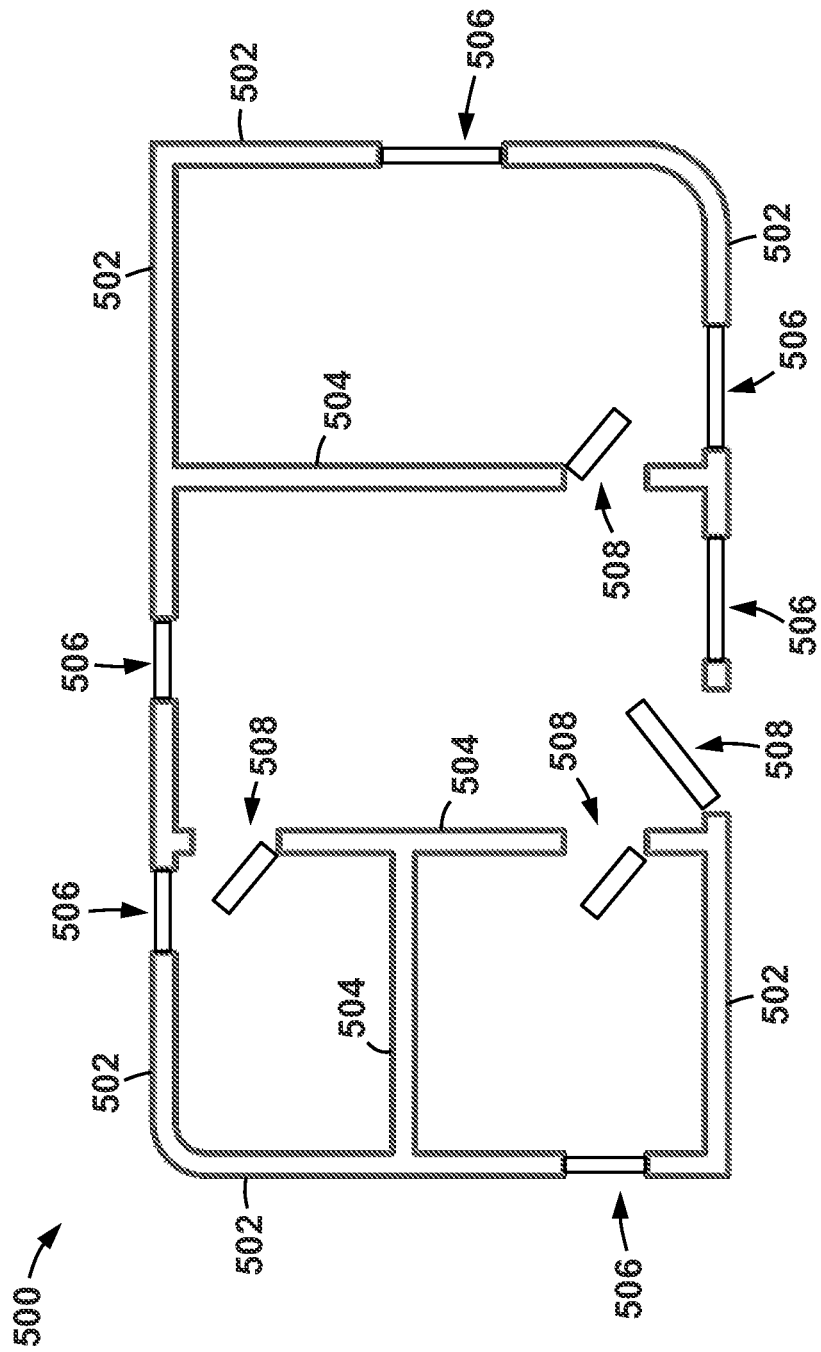
FIG. 21 is a diagram of a floor plan of a structure constructed according to some embodiments.

Referring now to FIG. 21, a floor plan of a structure 500 that may be designed and constructed according to some embodiments is shown. In this embodiment, structure 500 is a single story structure; however multi-story structures (e.g., such as a two-story or three-story structure) may also be constructed via the system and methods described herein. Structure 500 includes a plurality of walls—including a plurality of exterior walls 502 and a plurality of interior walls 504. In addition, structure 500 includes a plurality of windows 506 extending through exterior walls 502, and a plurality of doors frames 508 extending through both exterior walls 502 and interior walls 504.

Methods of designing structure 500 will now be described with reference to FIGS. 22-32. In general, the following method may be utilized to design and characterize structure 500 so that a 3D printing operation to form structure 500 may be accomplished utilizing an appropriate construction system, such as, for example, construction systems 10, 300, 400, previously described above.

Referring now to FIGS. 21 and 22, once the floor plan of structure 500 is finalized (e.g., such as the floor plan shown in FIG. 21), the floor plan, including the walls 502, 504, windows 506, and door frames 508 is reduced down to a line diagram 510 including a series of line segments representing the general layout of the structure 500. Specifically, within the line diagram 510, each of the walls 502, 504 are represented by a series of line segments 512 extending between discrete points 514, and each of the windows 506, 508 are represented by gaps 516 between pairs of points 514 from different line segments 512. Within line diagram 510, points 514 are positioned both at the ends of the line segments 512 and at points of intersection between two or more line segments 512.

In addition, in this embodiment structure 500 includes a plurality of curved walls (e.g., such as two of the exterior walls 502 on structure 500). To represent these curved walls within line diagram 510, the straight portions of the walls 502 are drawn as straight line segments that end in points 514 situated at the start of the curved section or portion. Next, a focal point 518 is fixed to thereby define the radius of curvature for the curved section of the wall 502, and a curved line segment 519 is drawn along that defined curvature between the two points 514 of the adjoining straight wall portions (which are represented by line segments 512 as previously described). As a result, the line diagram 510 represents a curved wall segment as a discrete curved line segment 519 (with a designated focal point or center of curvature 518) that joins or intersects with two adjoining straight line segments 512 at a pair of points 514, which thereby simplifies the geometric representation of the relatively complex curved portions of exterior walls 502 of structure 500.

Without being limited to this or any other theory, by first defining a line diagram 510 to define the wall segments, window, doors, etc. of structure 500, the nominal placement (e.g., the centerline placement) and length of each of the walls, windows, doors, etc. of structure 500 may be defined. In some embodiments, the line diagram 510 is derived (e.g., wholly or partially) by a computing device that is executing machine readable instructions. As a result, the variables, including the length of walls, the starting and ending points of walls, the curvature (for curved wall portions) of the walls, wall centerline location, the points of intersection between walls, etc. that are determined from the line diagram 510 may be captured and stored by the computing device. Thereafter, this data may be utilized in generating subsequent diagrams and plans in the manner described herein. In addition, in some embodiments, a multiple story structure may be represented by a plurality of line diagrams (e.g., like line diagram 510), wherein each story or level of the structure may have its own corresponding line diagram.

In addition, in some embodiments, multiple line diagrams 510 may be generated for a given story of a structure (e.g., so as to represent different vertical sections or levels of the given story).

Referring now to FIGS. 21-23, after line diagram 510 (and the variable and data associated therewith) is derived for structure 500 as previously described above, a 520 shell diagram is generated for each of the walls 502, 504 based on the positioning and length information provided by line diagram 510. Generally speaking, to generate shell diagram 520, each line segment from the line diagram 510 (e.g., line segments 512, 514 in FIG. 22) is given a wall thickness or width. In some embodiments, the wall thickness T may be represented as a distance extending perpendicular and equidistantly on each side of the line segments from the line diagram 510. The resulting shell diagram 520 in FIG. 23 shows the outer shell or borders 522 of the walls 502, 504 of structure 500. In this embodiment, the shell diagram 520 is derived by showing all of the windows 506 and door frames 508 open. The portions of borders 522 that form the inner edges of door frames 508 and windows 506 are referred to herein as end-cap ribs 533. As will be described in more detail below, the end-cap ribs 533 may not be present within all of the vertical sections or levels of structure 500 (e.g., such as at the top of a window or door frame where a structural header may be placed). In addition, as will also be described in more detail below, some portions of structure 500 may include wall segments that are closed proximate the windows 506 and/or door frames 508 (e.g., such as vertical sections of structure that are above or below a window 506 or above a door frame 508).

Referring still to FIGS. 21-23, within the shell diagram 520, a single enclosed border 522 is designated for connected or intersecting walls. In addition, in this embodiment, the thickness T of each wall (e.g., walls 502, 504) of structure 500 is the same; however, in other embodiments, the thickness T of the walls within a given structure may be varied. In these embodiments, the differences in thickness T for the various walls of the structure may be defined within the shell diagram 520. Further, within shell diagram 520, a bead thickness Ts may be defined for the lines forming borders 522. The bead thickness Ts may be determined by the thickness or width of the bead of extrudable building material that is extruded by the corresponding construction system (e.g., construction systems 10, 300, 400, etc.) during a construction operation. Because the bead thickness Ts influences the relative placement of the lines forming borders 522 to provide the desired wall thickness T, it is represented and included within shell diagram 520. In some embodiments, the bead thickness TB is a function of the construction system (e.g., the size and shape of outlet 112 of outflow conduit 110 previously described), and may either be a fixed or a ranged variable.

As a result of the shell diagram 520, the foot print and perimeter of structure 500 is defined. In addition, the width of the windows 506 and door frames 508 is also defined along with the internal area (e.g., square footage) of the structure 500 and any rooms defined therein. In some embodiments, shell diagram 520 may be derived (e.g., wholly or partially) by a computing device that is executing machine readable instructions. As a result, all of the above mentioned parameters and data (along with others) that are determined or derived from the shell diagram 520 are stored within the computing device, such that this data may be utilized in generating subsequent diagrams and plans in the manner described herein. In addition, a multi-story structure may be represented by a plurality of shell diagrams (e.g., like shell diagram 520) wherein each story or level of the structure may have its own corresponding shell diagram. In addition, in some embodiments, multiple shell diagrams 520 may be generated for a given story of a structure (e.g., so as to represent different vertical sections or levels of the given story).

Referring now to FIGS. 21, 24, and 25, once the outer borders 522 of the walls forming structure 500 are defined by shell diagram 520, infill 531 for partially or wholly filling the space defined within borders 522 is defined within an infill diagram 530. FIG. 24 shows the infill diagram 530 of structure 500, and FIG. 24 shows the infill diagram 530 superimposed atop the shell diagram 520 of FIG. 23 to better illustrate the features and function of the infill defined by diagram 530.

The infill 531 generated within infill diagram 530 may comprise a plurality of ribs 532 that extend perpendicularly between opposing sides (or walls) of border 522, and a plurality of lattice lines 534 (or more simply lattice 534) extending within the borders 522 along the walls (e.g., along the directions of the line segments from line diagram 510) between ribs 532 and/or end cap ribs 533. While end-cap ribs 533 are formed as portions of border 522 as previously described, end cap ribs 533 are represented in the infill diagram of FIG. 24 so as to show their position with respect to infill 531. Ribs 532 are disposed proximate each of the points 514 within line diagram 510 (see FIG. 22) and define a plurality of cores 540. Thus, cores 540 may be generally disposed at the lateral edges of door frames 508 and windows 506 and at the intersection of walls 502, 504 within structure 500. Accordingly, cores 540 that are formed at the edges or windows 506 or door frames 508 will include at least one end-cap rib 533, and at least one rib 532.

Cores 540 (which are defined by ribs 532 and portions of border 522, including end-cap ribs 533 as previously described) may be substantially hollow regions within walls 502, 504 that are formed by a plurality of vertically aligned ribs 532, and borders 522 (including end cap ribs 533) during the construction of structure 500. In some embodiments, following the construction (e.g., printing) of structure 500, the completed cores 540 are filled with a plurality of elongate steel members (e.g., rebar) and a cement mixture. Without being limited to this or any other theory, filled cores 540 may serve as vertical support columns within structure 500, thereby enhancing the structural integrity of structure 500.

In this embodiment, if two or more cores 540 are immediately adjacent one another within a wall or combined wall border 522 as depicted within the shell diagram 520, the two or more cores 540 may be merged into a single core 540. In some embodiments, if two or more cores 540 would be disposed within a certain distance X, which may be 1-10 inches along a given wall (e.g., wall 502, 504) in some embodiments, the two or more cores 540 are merged into a single core 540. For example, cores 540 that would be disposed at the intersection of multiple walls 502, 504 are merged into a single core 540. As another example, cores 540 are to be disposed at the ends of a relative short wall segment may be merged (e.g., if the distance between the two cores 540 is within distance X, previously described).

In this embodiment, cores 540 are all generally polygonal in shape. However, other non-polygonal shapes may be utilized in other embodiments. More specifically, many of the cores 540 within structure 500 may be rectangular and thus are defined by two ribs (e.g., either ribs 532 or a combination of ribs 532 and end cap ribs 533) and some portion of the corresponding border 522 (e.g., other than end-cap ribs 533). In addition, some of the cores 540, such as merged cores 540 at intersection of multiple walls 502, 504 may be formed by more than two ribs 532, 533 in addition to the portions of the corresponding border 522 (again other than end-cap ribs 533).

Figure 26:
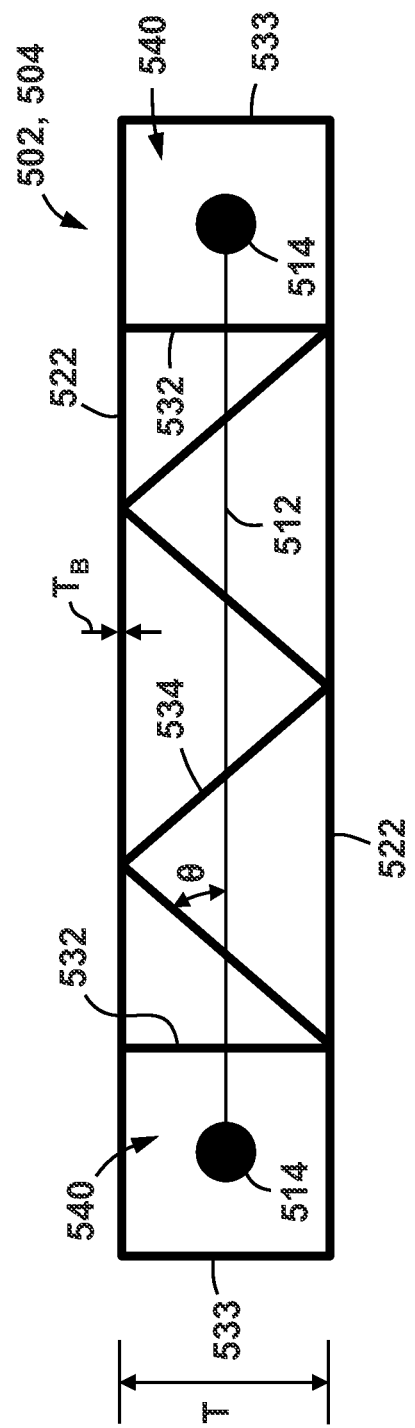
FIG. 26 is an enlarged schematic diagram of a wall segment according to some embodiments.

Referring still to FIGS. 21, 24, and 25, lattice 534 may extend between cores 540 along the corresponding wall 502, 504 (e.g., along the line segments 512 defined within line diagram 510 as shown in FIG. 22). Referring briefly to FIG. 26, lattice 534 may extend in a zig-zag pattern between the opposing borders 522 of the corresponding wall 502, 504 at an angle $\theta$ relative to the corresponding line segment 512 associated with the corresponding wall 502, 504. The angle $\theta$ may depend on a number of different factors, such as, for example, the length along the corresponding wall (e.g., wall 502, 504) between to ribs 532, 533, the thickness T of the wall, the bead thickness Ts (wherein each of the thickness T and the bead thickness Ts are previously described above), etc. In some embodiments, the angle $\theta$ may range from approximately 20° to approximately 45°.

Referring again to FIGS. 21, 24, and 25, in some embodiments, the length of a wall segment between two ribs 532, 533 may not be suitable (e.g., may not be long enough) for the placement of lattice 534. As result, lattice 534 may be omitted within the particular wall segment, therefore forming a void 535 (see void 535 shown in FIG. 25). In this embodiment, lattice 534 may be omitted within a given wall segment (thereby forming a void 535) when the distance between the two adjacent cores 540 within the corresponding wall segment is within a predetermined threshold limit (e.g., such as approximately 0 to 6 inches).

As shown in FIGS. 24 and 25, infill diagram 530 may further define a first subset of the infill 531 that is referred to as a variable infill 536 and a second subset of the infill 531 that is referred to as a fixed or invariable infill 538. As will be described in more detail below, the fixed infill 538 may be present at all vertical levels or slices of structure 500, while the variable infill 536 may be present within less than all of the vertical levels or slices of structure 500. Typically, the variable infill 536 is associated with windows (e.g., windows 506) and doors frames (e.g., door frames 508) extending through the walls (e.g., walls 502, 504) of the structure (e.g., structure 500, which create discontinuities within the walls when moving vertically therealong). In FIGS. 24 and 25, the variable infill 536 is shown with a dotted line, while the fixed infill 538 is shown with a solid line.

Without being limited to this or any other theory, by defining the infill 531 within infill diagram 530, including the variable infill 536 and fixed infill 538, the positioning of the infill 531 throughout structure 500 may be determined. As a result, as layers of extrudable building material are deposited via a printing construction operation to form structure 500, the infill 531 from the various layers may be properly aligned throughout the vertical height of structure 500. In some embodiments, infill diagram 530 may be derived (e.g., wholly or partially) by a computing device that is executing machine readable instructions. As a result, all of the above mentioned parameters and data (along with others) that are determined or derived from the shell diagram 530 may be stored within the computing device, such that this data may be utilized in generating subsequent diagrams and plans in the manner described herein. In addition, a multi-story structure may be represented by a plurality of infill diagrams (e.g., like shell diagram 530) wherein each story or level of the structure may have its own corresponding shell diagram.

Referring now to FIGS. 21 and 27, once diagrams 510, 520, 530 are derived and defined for structure 500, a master slice 550 may be defined that represents or depicts the shared or common features of the various vertical sections or slices of the structure 500 for construction operations. In this embodiment, the master slice 550 is defined by combining many of the defined or determined parameters from each of the diagrams 510, 520, 530 shown in FIGS. 22-25. For example, master slice 550 may be derived by combining and superimposing the borders 522, infill 531 (including fixed infill 538, and variable infill 536) from the diagrams 520, 530 that are shared among multiple vertical slices of structure 500 into a single cross-sectional diagram.

Referring briefly to FIG. 28, as previously described above, according to embodiments disclosed herein, structure 500 may be constructed via a 3D printing operation, with an appropriate construction system (e.g., construction systems 10, 300, 400, etc.). Specifically, during this process, layers 552 of extrudable building material (e.g., a cement mixture) are extruded and deposited one-by-one on a top surface 4a of a foundation 4 (which may comprise a concrete and rebar slab as previously described above), such that the plurality of stacked layers 552 form the structure 500. As used herein, the term "slice" refers to a subset of vertically adjacent layers 552 within the structure 500 (e.g., such as slices 551, 553, 555, 557 shown in FIG. 28 and discussed in more detail below). Accordingly, the master slice 550 of FIG. 27 is a derived slice of structure 500 that may be imaginary (e.g., master slice 550 may not represent an actual slice of the physical structure 550). Once derived, the master slice 550 may be used to define the shared or common parameters and features of some or all of the slices making up the structure 500. As a result, the design of each of the individual slices of structure 500 may be derived as a variant of the master slice 550, so that common features (e.g., borders 522, infill, etc.) are properly carried into each of the slices during operations. Without being limited to this or any other theory, by designing each of the actual slices of structure 500 from an imaginary master slice 550 that includes many of the shared or common components of the actual slices, vertical alignment of the shared features may be more readily and reliably achieved within structure 500.

Referring now to FIGS. 24 and 27, master slice 550 shows all of the windows 506 and door frames 508 of structure 500 open. In addition, master slice 550 may include all infill 531 (e.g., fixed infill 538 and variable infill 536 in FIG. 24) and borders 522 that are shared by multiple slices of structure 500. Specifically, in this embodiment, master slice 550 may include all fixed infill 538 and all of the borders 522 from shell diagram 520, including end-cap ribs 533. As will be described in more detail below, end cap ribs 533 are not included within the vertical slice of structure 500 that includes the structural headers above the window 506 or door frames 508 (see headers 554 in FIG. 28 which are discussed in more detail below). However, because end cap ribs 533 are included within most of the other vertical slices within structure 500 (e.g., see slices 551, 553, 557 of structure 500 shown in FIG. 28), they are also included within master slice 500. In this embodiment, the master slice 550 is identical to the slice 553 shown in FIG. 28; however, this results from the specific design of structure 500. In other embodiments, the master slice 550 may not identically match any of the sections or slices of the final structure (e.g., structure 500) as previously described above.

Referring now to FIGS. 27 and 28, master slice 550, once derived, is utilized as a starting point to define specific vertical slices of structure 500 as previously described above. For example, as shown in FIG. 28, structure 500 includes a total of four difference slices—namely a first slice 551 extending vertically from top surface 4a of foundation 4 (wherein foundation 4 is the same as previously described above for structure 5) to the lower end of the windows 506, a second slice 553 extending from the lower end of the windows 506 to the headers 554 of each of the windows 506 and door 508, a third slice 555 that extends vertically through the vertical height of the headers 554, and a fourth slice 557 extending vertically from the top of the headers 554 to the top of the walls 502, 504 of structure 500. The layers 552 of extrudable building material (e.g., a cement mixture) making up each slice 551, 553, 555, 557 are identical within each slice (e.g., slices 551, 553, 555, 557).

Thus, the construction of each slice 551, 553, 555, 557 via a 3D printing operation may be described or represented as a repeatable set of lateral printing assembly movements (e.g., printing assemblies 100, 200, etc.) relative to foundation 4 that are separated by an incrementally increasing vertical height (e.g., the height of each extruded layer of building material). Accordingly, the construction of structure 500 may then be described or represented as a finite set of lateral printing assembly movements that are each repeated a predetermined number of times, with an incrementally increasing vertical height at each repetition, wherein each specific lateral printing assembly movement is associated with one of the slices 551, 553, 555, 557. The specific lateral printing movement associated with a given slice 551, 553, 555, 557 may also be represented as a set of instructions (e.g., machine readable instructions) that are executed by a processor (e.g., processor 204) of a controller (e.g., controller 202 or other computing device) associated with the construction system utilized to construct structure 500 (e.g., construction system 10, 300, 400, etc.). Each of the specific slices 551, 553, 555, 557 of structure 500 will now be described with more specificity below with reference to FIGS. 28-32.

Figure 29:
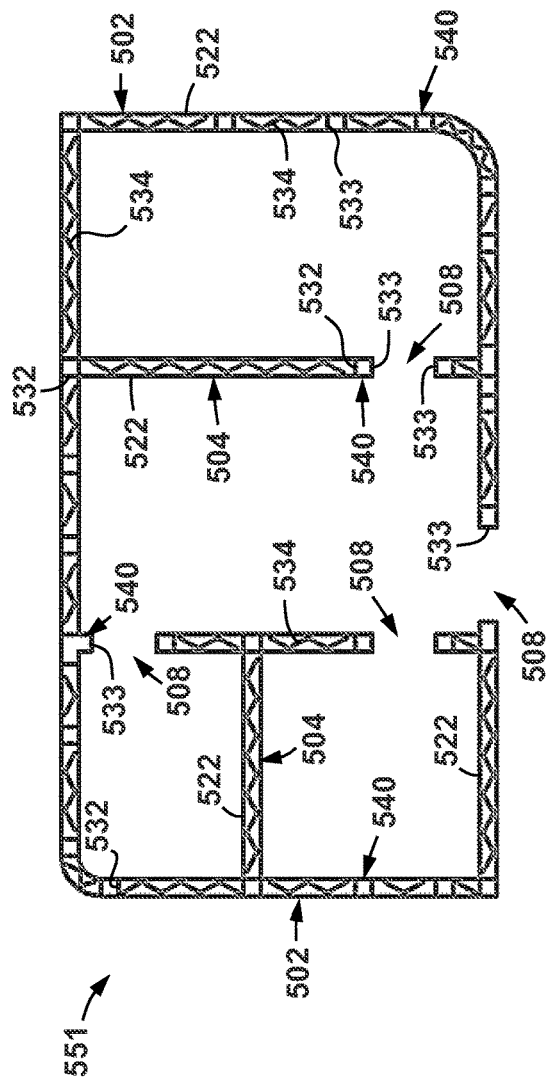

Specifically, referring first to FIGS. 28 and 29, first slice 551 represents the lowermost vertical slice of structure 500. Thus, the layers 552 forming first slice 551 are stacked directly on top surface 4a of foundation 4. In addition, within first slice 551, only door frames 508 of structure 500 are open (see also FIG. 21), since first slice 551 is disposed below the lower ends of the windows 506. Accordingly, first slice 551 includes borders 522 from master slice 550 but also includes additional borders 552 disposed along the locations of windows 506. In addition, first slice 551 includes all of the infill 531 (e.g., fixed infill 538) disposed within the master slice 550 (see FIG. 27), and also the variable infill 536 that is disposed along windows 506 (see infill diagram 530 in FIGS. 24 and 25). As a result, first slice 551 may be defined as the master slice 550 from FIG. 27 with additional borders 522 and infill (e.g., variable infill 536) that is disposed along the locations of windows 506.

Figure 30:
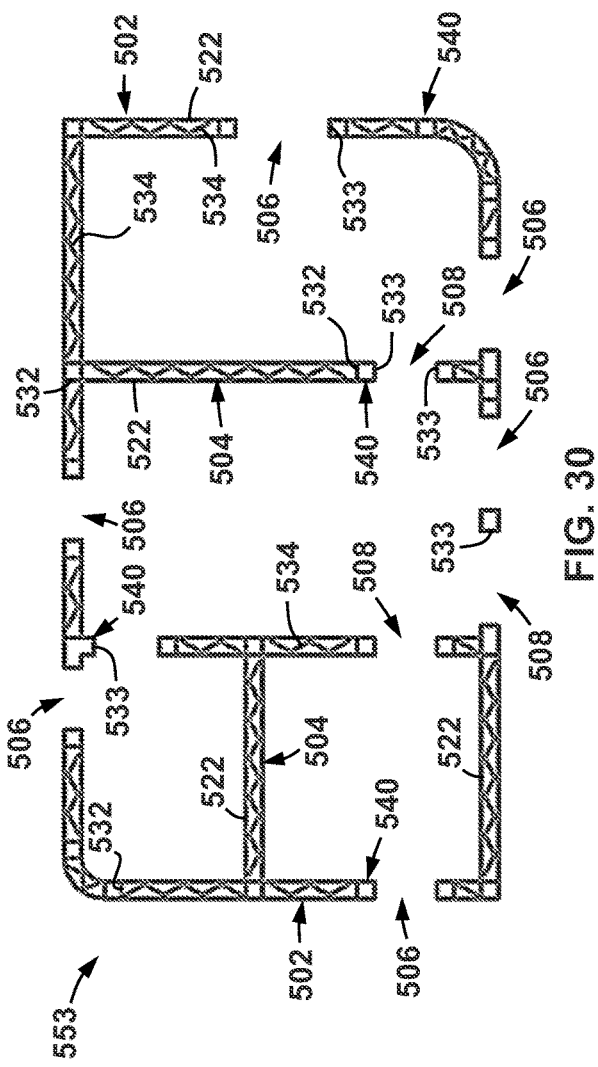

Referring now to FIGS. 28 and 30, second slide 553 represents the slice of structure 500 that is vertically adjacent first slice 551 and extends vertically through the windows 506 and to the top of door frames 508. Thus, second slice 553 includes all of the borders 522 (including end cap ribs 533) and fixed infill 538 from master slice 550 (see FIG. 27). As a result, the second slice 552 may be defined as being a copy of the master slice 550.

Referring now to FIGS. 28 and 31, third slice 555 represents the slice or portion of structure 50 that is encompassed by the headers 554 of door frames 508 and windows 506. Accordingly, third slice 555 may be defined as master slice 550 but with portions of the borders 522 (including end cap ribs 533) removed to account for the placement of the headers 554 above the windows 506 and door frames 508.

In this embodiment, headers 554 comprise elongate members that are inserted immediately above a window 506 or door frame 508 to distribute weight around the edges or sides of the windows 506 and door frames 508. During construction of structure 500, headers 554 are manually inserted (e.g., by a worker) before, during, or after the printing or forming of second slice 553 by the corresponding construction system (e.g., construction system 10, 300, 400, etc.). Headers 554 may comprise any suitable material, such as, for example steel, wood, concrete (e.g., such as a concrete plank or board). As shown in FIG. 28, in this embodiment, headers 554 have the same vertical thickness as two layers 552 of building material, and thus third slice 555 comprises two layers 552. In other embodiments, the vertical thickness of headers 554 may be more or less than two layers 552.

Finally referring to FIGS. 28 and 32, fourth slice 557 extends vertically from third slice 555 (and thus from headers 554) to the top of the walls 502, 504 (see FIG. 21). As can be appreciated from FIG. 28, the fourth slice 557 is located vertically above all of the windows 506 and door frames 508 of structure 500. As a result, fourth slice 557 includes all of the borders 522 (including end cap ribs 533) included within master slice 550 and additionally includes borders 522 that extend along the locations of windows 506 and door frames 508. In addition, fourth slice 557 includes all of the infill 531 from the master slice 550, and additionally includes the variable infill 536 that is defined by infill diagram 530 for extending along the locations of windows 506 and door frames 508. Therefore, fourth slice 557 may be defined as the master slice 550 with additional borders 522 and infill that extends along the locations of the windows 506 and door frames 508 within structure 500.

Referring again to FIGS. 28-32, together, each of the slices 551, 553, 555, 557 may be used to form or print structure 500. Specifically, during a printing construction operation (e.g., a construction operation utilizing a construction system 10, 300, 400, etc.), the construction system (e.g., via a central controller, such as controller 202 previously described) may first be directed to print a predetermined number of vertically stacked layers 552 of the first slice 551. Thereafter, the construction system may be directed to print a predetermined number of vertically layers 552 of the second slice 553 atop the previously printed layers of the first slice 551.

Next, the construction system may be directed to print a predetermined number of vertically stacked layers 552 of the third slice 555 atop the previously printed layers of second slice 553. Third slice 555 includes headers 554 as previously described above. In some embodiments, headers 554 may be placed in their positions atop the second slice 553 prior to initiating construction (e.g., printing) operations of third slice 555. In other embodiments, headers 554 may be placed simultaneously or concurrently with printing the third slice 555. In still other embodiments, headers 554 may be placed in their respective positions after the layers 552 of third slice 555 have been printed.

Regardless of the precise order or method used to place headers 554 within third slice 555, once third slice 555 (including headers 554) is printed, the construction system is directed to print a predetermined number of vertically stacked layers 552 of fourth slice 557 atop third slice 553 and headers 554. Following the printing of fourth slice 557, a roof or other top covering (not shown) may be constructed atop fourth slice 557 to complete structure 500. In some embodiments, the roof may be constructed atop fourth slice 557 after all of the slices 551, 553, 555, 557 have fully dried and cured (which may take one or several days or possibly weeks). In other embodiments, the roof may be constructed or installed atop fourth slice 557 once slices 551, 553, 555, 557 are partially (but not completely) dried and/or cured.

According, a structure 500 is constructed via a 3D printing operation, by reducing the structure down to finite sets of repeatable printing instructions or plans. These sets of instructions may be executed by the construction system (e.g., construction systems 10, 300, 400, etc.) to print or build structure 500 layer by layer 552, and slice by slice (e.g., slices 551, 553, 555, 557). It should be appreciated that during the printing operations described above, no forms or molds are included to contain or channel the deposited or printed extrudable building material. As will be described in more detail below, the extrudable building material may be configured to stiffen relatively quickly after being deposited by the printing assembly (e.g., printing assembly 100, 200, 390, etc.) either on top surface 4a of foundation 4 or on a previously printed layer 552. However, in some embodiments, the building material does not stiffen so quickly so as not to adequately bind to the next adjacent vertical layers 552 that are subsequently deposited thereon.

Referring still to FIGS. 28-32, to facilitate the printing or forming of each layer 552 of slices 551, 553, 555, 557 of structure 500 as described above, a printing assembly path or a plurality of such paths (which may be more generically referred to as "tool paths") may be defined for the depositing the layers 552 of each slice 551, 553, 555, 557. The tool paths may be expressed as sets of instructions (e.g., machine readable instructions) for actuating the printing assembly relative to the foundation 4 (e.g., laterally relative to the foundation 4) as the printing assembly deposits beads of printing material (e.g., cement) thereon. Thus, in some embodiments the instructions for the tool paths may comprise instructions for actuating one or more drivers (e.g., drivers 42, 87, 116) that cause or drive a movement of a printing assembly (e.g., printing assemblies 100, 200) along a defined set of directions or axes (e.g., axes 12, 14, 16).

Referring now to FIGS. 33 and 34, which show sequential schematic views of a printing operation for a single layer 552 of a slice of another structure 560. Structure 560 is a single room structure that includes a plurality of exterior walls 502 and a single door frame 508. As with structure 500, previously described, the walls 502 of structure 560 are defined by a plurality of borders 522 (including end cap ribs 533 at door frame 508). In addition, infill 531, which further includes ribs 532 and lattice 534, is disposed within borders 522 of walls 502.

Referring first to FIG. 33, during a printing operation for a layer (e.g., layer 552) of structure 560, a printing assembly 570 (which may be the same or similar to printing assemblies 100, 200, 390 previously described) is first traversed about foundation in a first tool path 572 while simultaneously extruding lines or beads of building material (e.g., cement) to form the outer borders 522 of walls 502.

The first tool path 572 of printing assembly 570 may include a plurality of movements. For example, in this embodiment, tool path 572 first moves printing assembly 570 along the borders 522 of the walls 502. In particular, printing assembly 570 is traversed across foundation 4 from a starting position 573 along a continuous path while printing assembly 570 deposits a line of extrudable building material (e.g., a cement mixture) that forms the connected borders 522 of walls 502. In this case, because structure 560 only includes exterior walls 502, all of the walls 502 are interconnected, such that one single continuous movement of printing assembly 570 that starts and ends at starting point 573 may be performed to print an enclosed border 522. In other embodiments (e.g., such as when printing the slices 551, 553, 555, 557 of structure 500), printing assembly 570 may be traversed along a plurality of loops or routes to form a continuous enclosed border 522 about each connected set of walls 502, 504 (see e.g., the separate enclosed borders 522 of shell diagram 520 in FIG. 23).

Referring specifically to FIG. 34, after borders 522 of walls 502 are formed or printed by printing assembly 570, the printing assembly 570 may then be traversed along a second tool path 574 while simultaneously extruding lines or bands of extrudable building material (e.g., a cement mixture) to form the infill 531, including ribs 532 and lattice 534 within borders 522. The second tool path 574 may include a plurality of movements. For example, in this embodiment, tool path 574 moves printing assembly 570 along the walls 502 from a starting point 575 along continuous path that tracks generally along walls 502. As printing assembly 570 advances along walls 502 and tool path 574, it is maneuvered as necessary to form the ribs 532 and lattice 534 in desired locations (e.g., printing assembly 570 may be moved in a zig-zag pattern as part of the tool path 574 to form lattice 534). In this embodiment, because structure 560 only includes exterior walls 502 and all the walls 502 are interconnected as previously described, one single continuous movement of the printing assembly 570 may be defined for the second tool path 574 that starts and ends at starting point 575. In other embodiments, (e.g., such as when printing the slices 551, 553, 555, 557 of structure 500), printing assembly 570 may be traversed along a plurality of loops or routes to form the infill (e.g., including ribs 532 and lattice 534) within the enclosed border 522 of each connected set of walls 502, 504.

In some embodiments, the final tool paths for printing assembly 570 (e.g., tool paths 572, 574) when printing a layer of a slice of a structure (e.g., structures 560, 500, etc.) may be determined by first calculating or otherwise determining some or all of the possible tool paths that may be taken to form the borders 522, ribs 532, and lattice 534 of the given slice. Thereafter, the most efficient of the plurality of calculated paths may be chosen as the final path(s) for printing assembly 570.

Figure 35:
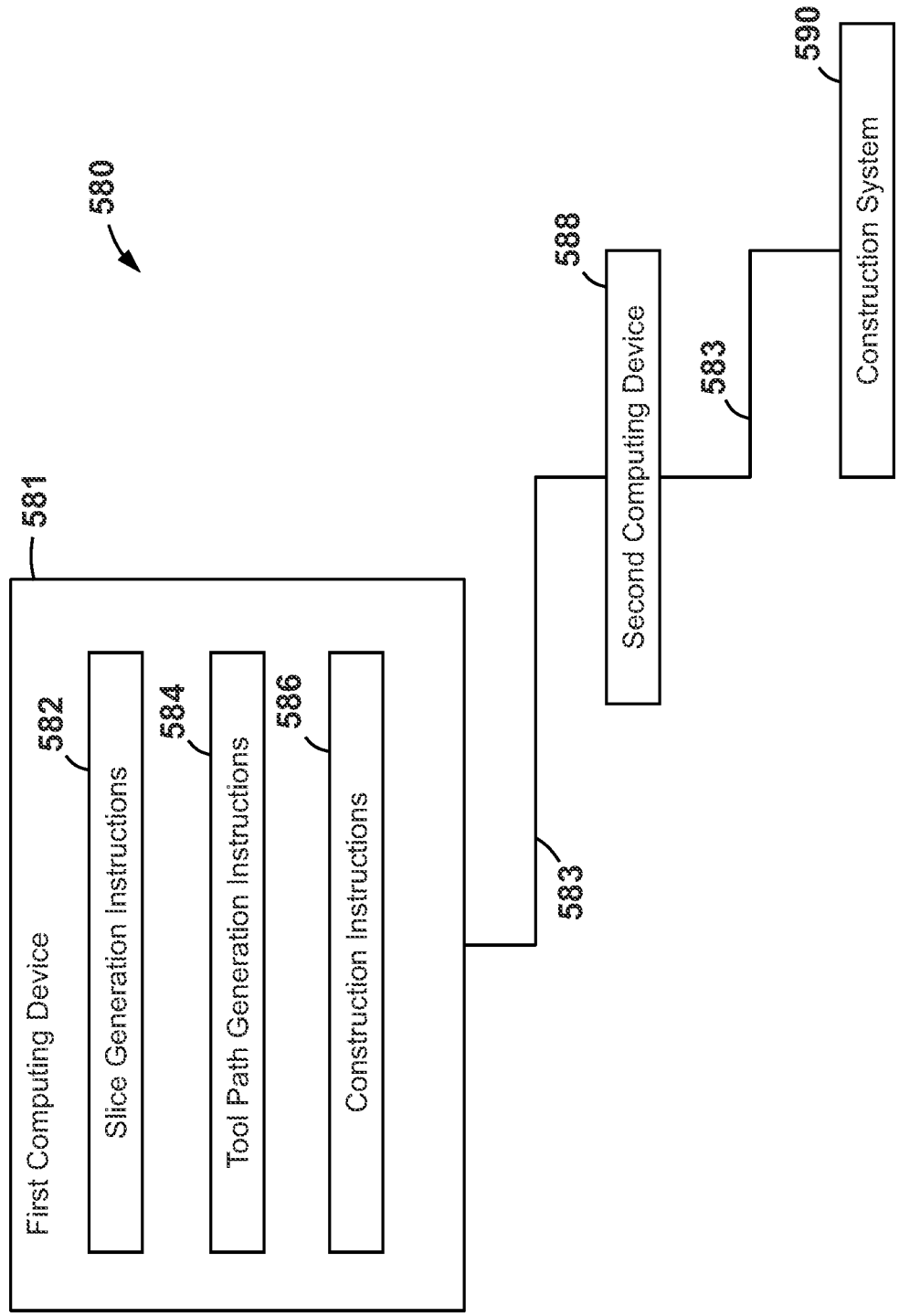
FIG. 35 is a schematic view of a system for designing and constructing a structure according to some embodiments.

Referring now to FIG. 35, a system 580 for carrying out some or all of the structure design and construction methods described herein is shown. System 580 includes a first computing device 581, a second computing device 588, and a construction system 590. Construction system 590 may be the same or similar as constructions systems 10, 300, 400, previously described, and thus, the descriptions of these constructions systems 10, 300, 400 may be applied to describe construction system 590.

First computing device 581 and second computing device 588 may comprise any suitable computing device (or collection of such devices). Thus, computing devices 581, 588 may include one or more processors, memory devices, power sources, etc. to enable the computing devices 581, 588 to perform all of the functions disclosed herein (e.g., such as processor 204 and memory 205 described above for controller 202). For example, computing devices 581, 588 may comprise one or more computers, servers, controllers, or the like. In some embodiments, second computing device 588 may comprise controller 202 previously described. In addition some embodiments, the first computing device 581 and the second computing device 588 may be integrated within a single computing device.

Referring still to FIG. 35, first computing device 581 includes machine readable instructions that are stored on a suitable memory device (e.g., any one or more of the memory devices discussed above for controller 202). In particular, first computing device 581 includes a set of slice generation instructions 582, a set of tool path generation instructions 584, and a set of construction instructions 586. In some embodiments, some or all of the instructions 582, 584, 586 may be integrated into a single set of instructions. Still further, in some embodiments, any one of the instructions 582, 584, 586 may be separated out into a plurality of separate sets of instructions.

Slice generation instructions 582 may include machine readable instructions that, when executed by computing device 581 (or a processor of the computing device 581), generate a plurality of vertical slices of a structure to be constructed, such as slices 551, 553, 555, 557 of structure 500 previously described. When executed by computing device 581, the slice generation instructions 582 may generate the slices for the structure based on a number of inputs (e.g., wall thickness T, bead thickness TB, structure dimensions, etc.). In addition, when executed by computing device 581, the slice generation instructions 582 may first generate a plurality of diagrams, such as the diagrams 510, 520 530 previously described above, and then utilize these generated diagrams in the manner previously described to generate master slice such as, for example, master slice 550. Further, when executed by the computing device 581, the slice generation instructions may then generate the slices (e.g., slices 551, 553, 555, 557) of the structure based on the master slice (e.g., master slice 550) as previously described.

Tool path generation instruction 584 includes machine readable instructions, that when executed by computing device 581 (or a processor of computing device 581), generate one or more tool paths for a printing assembly (e.g., printing assembly 100,200 etc.) during printing of the slices generated by the slice generation instructions 582. The tool path generation instructions 584, when executed by first computing device 581, may generate the tool path(s) in substantially the same manner as discussed above for example structure 560. Specifically, in some embodiments, the tool path generation instructions 584, when executed by first computing device 581, may generate the tool paths such that the outer borders (e.g., border 522) of walls (e.g., walls 502, 504) within a given slice are printed first, and then infill (e.g., ribs 532, lattice 534) is printed within the previously printed borders 522.

Construction instructions 586 include machine readable instructions, that when executed by computing device 581 (or a processor of computing device 581), generate a sequence of construction steps for a construction system (e.g., construction system 590) during a printing or construction process. In particular, the construction instructions 586 may, when executed by the computing device 581, generate a series of instructions for printing a predetermined number of layers of each slice generated by the slice generation instructions 582 by moving the printing assembly of the construction system 590 along one or more of the tool paths generated by the tool path generation instructions 584. Specifically, in some embodiments, the construction instruction 586 may, when executed by the computing device 581, generate a set of instructions for printing a predetermined plurality of layers (e.g., layers 552) of a first slice (e.g., first slice 551) of a structure (e.g., structure 500) generated by the slice generation instruction 582, by moving the printing assembly of the construction system along one or more tool paths (e.g., tool paths 572, 574) generated the tool path generation instruction 584 to form each layer. In addition, the construction instructions 586 may also provide instructions for similarly printing other layers of the other slices of the structure along designated tool paths generated by the tool path generation instructions.

Second computing device may receive the specific instructions and data generated by slice generation instructions 582, tool path generation instruction 584, and construction instruction 586 within first computing device 581 via a connection 583. Connection 583 may be any suitable wireless or wired connection (e.g., such as any of the above described wireless or wired connections). In addition, connection 583 may comprise a removable storage device (e.g., USB thumb drive, disc, etc.) that receives and stores the specific instructions from first computing device 581, and then transfers the received specific instructions to second computing device 588 by being connected to second computing device 588.

Referring still to FIG. 35, second computing device (which again may comprise controller 202 previously described above), may then execute the instructions generated within first computing device 581 and therefore actuate construction system (e.g., via another connection 583) to print the vertically stacked layers (e.g., layers 552) and slices (e.g., slices 551, 5553, 555, 557) of the structure (e.g., structure 500) as previously described above.

Referring now to FIG. 36, an embodiment of a method 600 of designing and constructing a structure (e.g., structures 5, 500, 560) is shown. In describing the specific steps of method 600, reference may be made to structure 500, diagrams 510, 520 530, slices 550, 551, 553, 555, 557 shown in FIGS. 21-25 and 27-32; however, it should be appreciated that method 600 may be practiced separately from these specific embodiments. Thus, specific reference to the embodiments and descriptions associated with FIGS. 21-25 and 27-32 is meant to provide additional clarity to method 600 and should be interpreted as limiting the potential scope thereof. In addition, some or all of the portions of method 600 may be practiced, in some embodiments, by computing devices (e.g., computing devices 581, 588 within system 580 previously described).

Initially, method 600 begins by defining a plurality of parameters for a structure to be constructed 605. For example, with reference to structure 500, parameters such as the bead thickness Ts, the wall thickness T, the location and number of door frames 508 and windows 506, the general layout of interior and exterior walls 504 and 502, respectively, of the structure 500 may be predetermined and defined at 605. In some embodiments, at least some of the above described parameters, such as, for example, the locations of door frames 508 and windows 506 may be determined and derived at 605 by generating a line diagram for structure 500, such as the line diagram 510 shown in FIG. 22 and previously described above.

Next, method 600 includes deriving the shells (or outer borders) of the internal and external walls of the structure at 610 based on the plurality of parameters defined at 605. For example, with reference to structure 500, a shell diagram 520 may be derived at 610 that defines the general outline or border 522 of the exterior walls 502 and the interior walls 504 of structure 500. Method 600 also includes deriving infill to be disposed within the borders of the internal and external walls of the structure at 615. For example, with reference to structure 500, an infill diagram 530 may be derived at 615 that defines the infill 531 to be disposed within the borders 522 of the exterior walls 502 and the interior walls 504 at 615. Accordingly, at 615, a plurality of ribs (e.g., ribs 532) and lattice 534 may be derived and placed within borders 522. In addition, the derivation of infill at 615 may further include the defining of fixed infill 538 and variable infill 536 in the manner previously described above.

Next, method 600 includes deriving a master slice at 620 that includes borders and infill derived at 610 and 615, respectively, that are shared or are common for multiple vertical slices of the structure at 620. For example, with reference to structure 500, a master slice 550, previously described, may be derived at 620. Thereafter, method 600 progresses to derive a plurality of slices that each represents a vertical slice or section of the structure at 625. For example, referring to structure 500, a plurality of slices 551, 553, 555, 557 (see FIGS. 28-32) are defined that each represent a vertical section or slice of structure 500. In some embodiments (such as those described above), the slices derived at 625 may be defined as variants of the master slice derived at 620, such as is previously described above for slices 551, 553, 555, 557 and master slice 550.

Method 600 next includes generating a set of instructions at 630 for printing each slice derived at 625. In some embodiments, the instructions generated at 630 may be instructions for a series of tool movements (e.g., tool paths 572, 574), such as, movements of a printing assembly (e.g., printing assembly 100, 200, 390, etc.) across a foundation (e.g., foundation 4) as previously described above. In some embodiments, the instructions may be similar to those discussed above for printing slices 551, 553, 555, 557 of structure 500.

Finally, method 600 includes printing a layer of a first of the slices at 635 per the instructions generated at 630, repeating the printing at 635 to form a plurality of vertically stacked layers of the first slice at 640, and repeating the printing at 635 and 640 to form a plurality of vertically stacked layers of each of the slices. For example, with reference to structure 500, multiple vertically stacked layers 552 of each slice 551, 553, 555, 557 may be sequentially printed in a predetermined order as previously described above in order to print structure 500. Specifically, a layer 552 of a first slice 551 may be printed, and then additional layers 552 of first slice 551 may be printed to form a plurality of vertically stacked layers 552 of first slice 551. Then this process is repeated at number of times to sequentially form the plurality of stacked layers 552 of each of the slices 552, 555, 557 as previously described.

During the performance of blocks 635, 640, 645, additional components may be inserted or installed within and amongst the plurality of vertically stacked layers. For example, other structural members (e.g., headers 554) as well as utility conduits (e.g., plumbing, electrical conductors, etc.) may be installed. In addition, the installation of some or all of these additional components may occur after the performance of 635, 640, 645.

In the manner described, systems and methods for designing and constructing a structure via 3D printing have been described. In some embodiments, the above described methods and systems may be utilized with any one of the constructions systems previously described herein to construct a structure. Accordingly, by use of the systems and methods disclosed herein, the time and materials required to construct a structure may be reduced.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A method of constructing a wall of a structure comprising:
   traversing a printer assembly in two axes to form a first layer of extrudable building materials and traversing the printer assembly in an axis orthogonal to the two axes to form subsequent layers of extrudable building materials;
   depositing a plurality of layers of an extrudable building material on a foundation, wherein a subset of the layers is formed comprising:
   depositing a portion of a bead of the extrudable material to form an end cap portion of an enclosed border of the wall at an opening or at least one intersection of an exterior and an interior wall;
   depositing a plurality of beads of the extrudable material within the enclosed border to form an infill of at least a portion of the wall;
   depositing the portion of bead perpendicular to form a perpendicular bead between opposing sides of the enclosed border and spaced at a parallel distance from the end cap portion of the enclosed border of the wall to form a polygonal hollow core between the perpendicular bead and the end cap portion exclusive of the infill; and
   filling the polygonal hollow core with an elongated metal member and a cement mixture extending vertically substantially a height relative to the opening.

2. The method of claim 1, wherein filling the polygonal hollow core with the elongated metal member and the cement mixture comprises:
   filling the polygonal hollow core with a re-bar structure.

3. The method of claim 1, wherein activating the first subset and the second subset of one or more drivers comprises:
   activating a first driver to transverse the printer assembly along a first axis;
   activating a second driver to transverse the printer assembly along a second axis, the first and the second drivers traverse the printer assembly within a plane;
   activating a third driver to traverse the printer assembly in the axis orthogonal to the plane to form the polygonal hollow core extending vertically substantially the height relative to the opening.

4. The method of claim 1, wherein depositing the portion of the bead of the extrudable material to form the end cap portion at the opening comprises:
   depositing the portion of the bead of the extrudable material to form a door or a window.

5. The method of claim 1, depositing the plurality of beads of the extrudable material within the enclosed border to form the infill comprises:
   forming one or more ribs and one or more lattice members.

6. The method of claim 5, wherein forming the one or more lattice members comprises:
   forming at least one lattice member at an angle to a line segment extending to the end cap portion of the enclosed border.

7. The method of claim 5, wherein depositing the plurality of beads of the extrudable material within the enclosed border to form the infill comprises:
   forming one or more of fixed infill and variable infill.

8. A system comprising:
   a memory configured to store machine readable instructions to construct a wall of a structure; and
   a processor configured to execute the machine readable instructions configured to:
   traverse a printer assembly in two axes to form a first layer of extrudable building materials and to traverse the printer assembly in an axis orthogonal to the two axes to form subsequent layers of extrudable building materials;
   deposit a plurality of layers of an extrudable building material on a foundation responsive to activating the first and the second of subset of drivers, wherein the processor is further configured to form a subset of the layers with execution of the machine readable instructions configured to:
- deposit a portion of a bead of the extrudable material to form an end cap portion of an enclosed border of the wall at an opening or at least one intersection of an exterior and an interior wall;
- deposit a plurality of beads of the extrudable material within the enclosed border to form an infill of at least a portion of the wall;
- deposit the portion of bead perpendicular to form a perpendicular bead between opposing sides of the enclosed border and spaced at a parallel distance from the end cap portion of the enclosed border of the wall to form a polygonal hollow core between the perpendicular bead and the end cap portion exclusive of the infill; and
- fill the polygonal hollow core with an elongated metal member and a cement mixture extending vertically substantially a height relative to the opening.

9. The system of claim 8, wherein the processor configured to fill the polygonal hollow core with the elongated metal member and the cement mixture is further configured to:
- fill the polygonal hollow core with a re-bar structure.

10. The system of claim 8, wherein the processor configured to activate the first subset and the second subset of one or more drivers is further configured to:
- activate a first driver to transverse the printer assembly along a first axis;
- activate a second driver to transverse the printer assembly along a second axis, the first and the second drivers traverse the printer assembly within a plane;
- activate a third driver to traverse the printer assembly in the axis orthogonal to the plane to form the polygonal hollow core extending vertically substantially the height relative to the opening.

11. The system of claim 8, wherein the processor configured to deposit the portion of the bead of the extrudable material to form the end cap portion at the opening is further configured to:
- deposit the portion of the bead of the extrudable material to form a door or a window.

12. The system of claim 8, the processor configured to deposit the plurality of beads of the extrudable material within the enclosed border to form the infill is further configured to:
- form one or more ribs and one or more lattice members.

13. The system of claim 12, wherein the processor configured to form the one or more lattice members is further configured to:
- form at least one lattice member at an angle to a line segment extending to the end cap portion of the enclosed border.

14. The system of claim 12, wherein the processor configured to deposit the plurality of beads of the extrudable material within the enclosed border to form the infill is further configured to:
- form one or more of fixed infill and variable infill.

15. A non-transitory computer readable medium having one or more computer program instructions configured to perform a method, the method comprising:
- traversing a printer assembly in two axes to form a first layer of extrudable building materials and traversing the printer assembly in an axis orthogonal to the two axes to form subsequent layers of extrudable building materials;
- depositing a plurality of layers of an extrudable building material on a foundation responsive to activating the first and the second of subset of drivers, wherein a subset of the layers is formed comprising:
  - depositing a portion of a bead of the extrudable material to form an end cap portion of an enclosed border of the wall at an opening or at least one intersection of an exterior and an interior wall;
  - depositing a plurality of beads of the extrudable material within the enclosed border to form an infill of at least a portion of the wall;
  - depositing the portion of bead perpendicular to form a perpendicular bead between opposing sides of the enclosed border and spaced at a parallel distance from the end cap portion of the enclosed border of the wall to form a polygonal hollow core between the perpendicular bead and the end cap portion exclusive of the infill; and
  - filling the polygonal hollow core with an elongated metal member and a cement mixture extending vertically substantially a height relative to the opening.

16. The method of claim 15, wherein filling the polygonal hollow core with the elongated metal member and the cement mixture comprises:
- filling the polygonal hollow core with a re-bar structure.

17. The method of claim 15, wherein depositing the portion of the bead of the extrudable material to form the end cap portion at the opening comprises:
- depositing the portion of the bead of the extrudable material to form a door or a window.

18. The method of claim 15, depositing the plurality of beads of the extrudable material within the enclosed border to form the infill comprises:
- forming one or more ribs and one or more lattice members.

19. The method of claim 18, wherein forming the one or more lattice members comprises:
- forming at least one lattice member at an angle to a line segment extending to the end cap portion of the enclosed border.

* * * * *